US011436567B2

(12) United States Patent
Ma et al.

(10) Patent No.: US 11,436,567 B2
(45) Date of Patent: Sep. 6, 2022

(54) CONFERENCE ROOM MANAGEMENT SYSTEM

(71) Applicant: Johnson Controls Tyco IP Holdings LLP, Milwaukee, WI (US)

(72) Inventors: Ada L. Ma, Kenmore, WA (US); Sudhi R. Sinha, Milwaukee, WI (US); Erik S. Paulson, Madison, WI (US); Elyse R. Hobson, Milwaukee, WI (US); Youngchoon Park, Brookfield, WI (US); Justin J. Ploegert, Cudahy, WI (US); Sarah Just, Milwaukee, WI (US); Kelsey Carle Schuster, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 16/746,517

(22) Filed: Jan. 17, 2020

(65) Prior Publication Data
US 2020/0234251 A1   Jul. 23, 2020

Related U.S. Application Data

(60) Provisional application No. 62/794,032, filed on Jan. 18, 2019, provisional application No. 62/794,348, (Continued)

(51) Int. Cl.
*G06Q 10/10* (2012.01)
*G06Q 30/06* (2012.01)
(Continued)

(52) U.S. Cl.
CPC ......... *G06Q 10/1095* (2013.01); *G05B 15/02* (2013.01); *G05B 19/042* (2013.01); (Continued)

(58) Field of Classification Search
CPC ......... G06Q 10/1095; G06Q 10/06398; G06Q 10/087; G06Q 10/10; G06Q 30/0633; (Continued)

(56) References Cited

U.S. PATENT DOCUMENTS 7,552,467 B2    6/2009   Lindsay
8,180,663 B2    5/2012   Tischhauser et al.
(Continued)

FOREIGN PATENT DOCUMENTS

AU    2019226217 A1    11/2020
AU    2019226264 A1    11/2020
(Continued)

OTHER PUBLICATIONS

Bernard "What Is Digital Twin Technology—and Why Is It So Important?", Jun. 2017, Enterprise Tech, pp. 1-4 (Year: 2017).*
(Continued)

*Primary Examiner* — Romain Jeanty
(74) *Attorney, Agent, or Firm* — Foley & Lardner LLP

(57) ABSTRACT

One or more non-transitory computer-readable storage media having instructions stored thereon that, when executed by one or more processors, cause the one or more processors to receive a request to hold a meeting in a building, retrieve user preferences associated with an attendee of the meeting, dynamically determine meeting parameters associated with the meeting based on the request and the user preferences, identify one or more meeting parameters that deviate from the request or the user preferences, and transmit a notification indicating the identified one or more meeting parameters.

8 Claims, 18 Drawing Sheets

Related U.S. Application Data filed on Jan. 18, 2019, provisional application No. 62/794,407, filed on Jan. 18, 2019, provisional application No. 62/794,415, filed on Jan. 18, 2019, provisional application No. 62/794,393, filed on Jan. 18, 2019, provisional application No. 62/794,276, filed on Jan. 18, 2019, provisional application No. 62/794,533, filed on Jan. 18, 2019, provisional application No. 62/794,389, filed on Jan. 18, 2019, provisional application No. 62/794,502, filed on Jan. 18, 2019, provisional application No. 62/794,357, filed on Jan. 18, 2019, provisional application No. 62/794,370, filed on Jan. 18, 2019, provisional application No. 62/794,535, filed on Jan. 18, 2019, provisional application No. 62/794,489, filed on Jan. 18, 2019.

(51) Int. Cl.
| | |
|---|---|
| *G06F 9/451* | (2018.01) |
| *G06F 16/28* | (2019.01) |
| *G06F 16/248* | (2019.01) |
| *G06F 16/25* | (2019.01) |
| *H04L 9/32* | (2006.01) |
| *G07C 9/37* | (2020.01) |
| *G07C 9/00* | (2020.01) |
| *G05B 15/02* | (2006.01) |
| *G05B 19/042* | (2006.01) |
| *G05B 23/02* | (2006.01) |
| *G06Q 10/08* | (2012.01) |
| *G06F 16/901* | (2019.01) |
| *G06Q 10/06* | (2012.01) |
| *G08G 1/14* | (2006.01) |
| *G07C 9/27* | (2020.01) |
| *G07C 9/21* | (2020.01) |
| *G07C 9/20* | (2020.01) |
| *G07C 9/22* | (2020.01) |
| *G07C 9/23* | (2020.01) |
| *G07C 9/25* | (2020.01) |
| *G07C 9/28* | (2020.01) |
| *G06V 20/52* | (2022.01) |
| *G06V 20/58* | (2022.01) |
| *G06V 40/10* | (2022.01) |
| *G06Q 50/26* | (2012.01) |
| *G06V 20/62* | (2022.01) |

(52) U.S. Cl.
CPC ......... *G05B 23/0218* (2013.01); *G06F 9/451* (2018.02); *G06F 16/248* (2019.01); *G06F 16/252* (2019.01); *G06F 16/288* (2019.01); *G06F 16/9024* (2019.01); *G06Q 10/06398* (2013.01); *G06Q 10/087* (2013.01); *G06Q 10/10* (2013.01); *G06Q 30/0633* (2013.01); *G06V 20/52* (2022.01); *G06V 20/586* (2022.01); *G06V 40/103* (2022.01); *G07C 9/00563* (2013.01); *G07C 9/21* (2020.01); *G07C 9/215* (2020.01); *G07C 9/22* (2020.01); *G07C 9/23* (2020.01); *G07C 9/253* (2020.01); *G07C 9/27* (2020.01); *G07C 9/28* (2020.01); *G07C 9/37* (2020.01); *G08G 1/142* (2013.01); *G08G 1/148* (2013.01); *G08G 1/149* (2013.01); *H04L 9/3247* (2013.01); *G05B 2219/25011* (2013.01); *G06Q 50/26* (2013.01); *G06V 20/625* (2022.01)

(58) Field of Classification Search
CPC ....... G06Q 50/26; G06F 9/451; G06F 16/288; G06F 16/248; G06F 16/252; G06F 16/9024; G07C 9/253; G07C 9/22; G07C 9/27; G07C 9/37; G07C 9/21; G07C 9/28; G07C 9/215; G07C 9/23; G07C 9/00563; G05B 15/02; G05B 19/042; G05B 23/0218; G05B 2219/25011; G06K 9/00369; G06K 9/00771; G06K 9/00812; G06K 2209/15; G08G 1/142; G08G 1/148; G08G 1/149; H04L 9/3247
USPC .......................................................... 705/7.19
See application file for complete search history.

(56) References Cited

U.S. PATENT DOCUMENTS

| | | |
|---|---|---|
| 8,346,589 B1 | 1/2013 | Norton et al. |
| 8,629,755 B2 | 1/2014 | Hashim-Waris |
| 8,907,803 B2 | 12/2014 | Martin |
| 9,202,322 B2 | 12/2015 | Kappeler et al. |
| 9,576,255 B2 | 2/2017 | Kalb et al. |
| 9,666,075 B2 | 5/2017 | Davies et al. |
| 9,811,249 B2 | 11/2017 | Chen et al. |
| 9,955,318 B1 | 4/2018 | Scheper et al. |
| 10,154,138 B2 | 12/2018 | Te Booij et al. |
| 10,171,297 B2 | 1/2019 | Stewart et al. |
| 10,380,854 B1 | 8/2019 | Yu |
| 10,505,756 B2 | 12/2019 | Park et al. |
| 10,564,993 B2 | 2/2020 | Deutsch et al. |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,921,760 B2 | 2/2021 | Harvey |
| 10,969,133 B2 | 4/2021 | Harvey |
| 11,041,650 B2 | 6/2021 | Li et al. |
| 11,054,796 B2 | 7/2021 | Holaso |
| 2002/0169514 A1 | 11/2002 | Eryurek et al. |
| 2002/0188557 A1 | 12/2002 | Ochiai |
| 2003/0150908 A1 | 8/2003 | Pokorny et al. |
| 2003/0158795 A1 | 8/2003 | Markham et al. |
| 2006/0015376 A1 | 1/2006 | Sattler et al. |
| 2006/0227010 A1 | 10/2006 | Berstis et al. |
| 2007/0250417 A1 | 10/2007 | Lane et al. |
| 2007/0250920 A1 | 10/2007 | Lindsay |
| 2008/0162198 A1 | 7/2008 | Jabbour et al. |
| 2008/0263467 A1 | 10/2008 | Wilkins |
| 2008/0266383 A1* | 10/2008 | Shah ................. H04N 7/15 348/E7.083 |
| 2009/0070407 A1* | 3/2009 | Castle ................ H04H 60/06 709/203 |
| 2010/0128931 A1 | 5/2010 | Bongard |
| 2011/0054968 A1 | 3/2011 | Galaviz |
| 2011/0184943 A1* | 7/2011 | Norton ................ G06Q 10/02 707/723 |
| 2012/0022698 A1 | 1/2012 | Mackay |
| 2012/0112929 A1 | 5/2012 | Gupta et al. |
| 2012/0143356 A1 | 6/2012 | Berg-Sonne et al. |
| 2012/0310852 A1 | 12/2012 | Ramalingamoorthy et al. |
| 2012/0323643 A1 | 12/2012 | Volz |
| 2013/0173062 A1 | 7/2013 | Koenig-Richardson |
| 2013/0226320 A1 | 8/2013 | Berg-Sonne et al. |
| 2013/0338970 A1 | 12/2013 | Reghetti |
| 2014/0334684 A1 | 11/2014 | Strimling |
| 2014/0358285 A1 | 12/2014 | Aggarwal et al. |
| 2015/0066716 A1 | 3/2015 | Shortridge |
| 2015/0138001 A1 | 5/2015 | Davies et al. |
| 2015/0156030 A1 | 6/2015 | Fadell et al. |
| 2015/0156031 A1 | 6/2015 | Fadell et al. |
| 2015/0220942 A1 | 8/2015 | Dubberley |
| 2015/0310682 A1 | 10/2015 | Arora et al. |
| 2016/0134432 A1 | 5/2016 | Hund et al. |
| 2016/0171785 A1 | 6/2016 | Banatwala et al. |
| 2016/0247129 A1 | 8/2016 | Song et al. |
| 2016/0260063 A1 | 9/2016 | Harris et al. |
| 2016/0357521 A1 | 12/2016 | Zhang et al. |
| 2017/0372271 A1* | 12/2017 | Goldsmith ............ H04L 67/22 |
| 2018/0005495 A1 | 1/2018 | Hieb |
| 2018/0018508 A1 | 1/2018 | Tusch |

(56) References Cited

U.S. PATENT DOCUMENTS

| | | |
|---|---|---|
| 2018/0211539 A1 | 7/2018 | Boss et al. |
| 2018/0268238 A1 | 9/2018 | Khan et al. |
| 2018/0275625 A1 | 9/2018 | Park et al. |
| 2018/0308475 A1 | 10/2018 | Locke et al. |
| 2018/0356775 A1 | 12/2018 | Harvey |
| 2018/0359111 A1 | 12/2018 | Harvey |
| 2019/0017719 A1 | 1/2019 | Sinha et al. |
| 2019/0065014 A1 | 2/2019 | Richter et al. |
| 2019/0088059 A1 | 3/2019 | Santhosh et al. |
| 2019/0089808 A1 | 3/2019 | Santhosh et al. |
| 2019/0096147 A1 | 3/2019 | Park et al. |
| 2019/0108492 A1 | 4/2019 | Nelson et al. |
| 2019/0121801 A1 | 4/2019 | Jethwa et al. |
| 2019/0122050 A1 | 4/2019 | Beals et al. |
| 2019/0130365 A1 | 5/2019 | Pell et al. |
| 2019/0138333 A1 | 5/2019 | Deutsch et al. |
| 2019/0158309 A1 | 5/2019 | Park et al. |
| 2019/0172165 A1 | 6/2019 | Verteletskyi et al. |
| 2019/0342112 A1 | 11/2019 | Li et al. |
| 2019/0361852 A1 | 11/2019 | Rogynskyy et al. |
| 2019/0377306 A1 | 12/2019 | Harvey |
| 2020/0035101 A1 | 1/2020 | Brooks et al. |
| 2020/0116505 A1 | 4/2020 | Lei et al. |
| 2020/0210906 A1 | 7/2020 | Rice et al. |
| 2020/0234523 A1 | 7/2020 | Ma et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2022/0121965 A1 | 4/2022 | Chatterji et al. |

FOREIGN PATENT DOCUMENTS

| | | |
|---|---|---|
| AU | 2019351573 A1 | 5/2021 |
| CN | 103942308 A | 7/2014 |
| CN | 105841293 | 8/2016 |
| EP | 3 268 821 B1 | 1/2018 |
| JP | 2008-310533 A | 12/2008 |
| JP | 2010-277532 A | 12/2010 |
| JP | 2015-060434 A | 3/2015 |
| KR | 2016066115 | 6/2016 |
| WO | WO-2018/132112 A1 | 7/2018 |
| WO | WO-2018/232147 A1 | 12/2018 |
| WO | WO-2020/061621 A1 | 4/2020 |
| WO | WO-2022/042925 A1 | 3/2022 |

OTHER PUBLICATIONS

HIPLA, "Visitor Management: Smart Solutions to visitors, saving time and maximizing productivity," URL: https://hipla.io/visitor-management.html, retrieved from internet Mar. 3, 2021, 3 pages.

Siemens, "The office as an active contributor to business success," URL: https://new.siemens.com/bg/en/products/buildings/markets/smart-office.html, retrieved from internet Mar. 4, 2021, 12 pages.

SPLAN, "Visitor Management: Manage visitor registrations and check-ins in an efficient and secured manner." URL: https://www.splan.com/visitor-management-system.html, 11 pages.

* cited by examiner

CONFERENCE ROOM MANAGEMENT SYSTEM

CROSS-REFERENCE TO RELATED APPLICATION

The present Applications claims the benefit and priority to U.S. Provisional Patent Application No. 62/794,370, filed on Jan. 18, 2019, U.S. Provisional Patent Application No. 62/794,276, filed on Jan. 18, 2019, U.S. Provisional Patent Application No. 62/794,533, filed on Jan. 18, 2019, U.S. Provisional Patent Application No. 62/794,535, filed on Jan. 18, 2019, U.S. Provisional Patent Application No. 62/794,389, filed on Jan. 18, 2019, U.S. Provisional Patent Application No. 62/794,393, filed on Jan. 18, 2019, U.S. Provisional Patent Application No. 62/794,415, filed on Jan. 18, 2019, U.S. Provisional Patent Application No. 62/794,032, filed on Jan. 18, 2019, U.S. Provisional Patent Application No. 62/794,357, filed on Jan. 18, 2019, U.S. Provisional Patent Application No. 62/794,348, filed on Jan. 18, 2019, U.S. Provisional Patent Application No. 62/794,407, filed on Jan. 18, 2019, U.S. Provisional Patent Application No. 62/794,502, filed on Jan. 18, 2019, and U.S. Provisional Patent Application No. 62/794,489, filed on Jan. 18, 2019, the entire disclosures of each of which are incorporated by reference herein.

BACKGROUND

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof. As the number of BMS devices used in various sectors increases, the amount of data being produced and collected has been increasing exponentially. Accordingly, effective analysis and information management of a plethora of collected data is desired.

SUMMARY

One implementation of the present disclosure is one or more non-transitory computer-readable storage media having instructions stored thereon that, when executed by one or more processors, cause the one or more processors to receive a request to hold a meeting in a building, retrieve user preferences associated with an attendee of the meeting, dynamically determine meeting parameters associated with the meeting based on the request and the user preferences, identify one or more meeting parameters that deviate from the request or the user preferences, and transmit a notification indicating the identified one or more meeting parameters.

In some embodiments, the request includes meeting attendees and wherein the one or more meeting parameters that deviate include one or more of the meeting attendees that cannot attend the meeting. In some embodiments, the request includes a meeting time and wherein the one or more meeting parameters that deviate include the meeting time. In some embodiments, the meeting parameters include at least a meeting time, a conference room, and available attendees. In some embodiments, the user preferences include a preferred conference room and wherein the one or more meeting parameters that deviate include the conference room, wherein the conference room is different than the preferred conference room. In some embodiments, the user preferences include a preferred meeting time and wherein the one or more meeting parameters that deviate include the meeting time, wherein the meeting time is different than the preferred meeting time. In some embodiments, the request includes meeting attendees, wherein the available attendees are a subset of the meeting attendees and wherein the notification is transmitted in response to comparing a number of the available attendees to a number of the meeting attendees. In some embodiments, the computing device dynamically determines second meeting parameters in response to the attendee responding to the transmitted notification.

Another implementation of the present disclosure is a method of a smart meeting system, including receiving a request to hold a meeting in a building, retrieving user preferences associated with an attendee of the meeting, dynamically determining meeting parameters associated with the meeting based on the request and the user preferences, identifying one or more meeting parameters that deviate from the request or the user preferences, and transmitting a notification indicating the identified one or more meeting parameters.

In some embodiments, the request includes meeting attendees and wherein the one or more meeting parameters that deviate include one or more of the meeting attendees that cannot attend the meeting. In some embodiments, the request includes a meeting time and wherein the one or more meeting parameters that deviate include the meeting time. In some embodiments, the meeting parameters include at least a meeting time, a conference room, and available attendees. In some embodiments, the user preferences include a preferred conference room and wherein the one or more meeting parameters that deviate include the conference room, wherein the conference room is different than the preferred conference room. In some embodiments, the user preferences include a preferred meeting time and wherein the one or more meeting parameters that deviate include the meeting time, wherein the meeting time is different than the preferred meeting time. In some embodiments, the request includes meeting attendees, wherein the available attendees are a subset of the meeting attendees and wherein the notification is transmitted in response to comparing a number of the available attendees to a number of the meeting attendees. In some embodiments, the computing device dynamically determines second meeting parameters in response to the attendee responding to the transmitted notification.

Another implementation of the present disclosure is a building management system (BMS), including one or more processing circuits and one or more computer readable storage media, the one or more computer readable storage media having instructions stored thereon that, when executed by the one or more processing circuits, cause the one or more processing circuits to receive a request to hold a meeting in a building, retrieve user preferences associated with an attendee of the meeting, dynamically determine meeting parameters associated with the meeting based on the request and the user preferences, identify one or more meeting parameters that deviate from the request or the user preferences, and transmit a notification indicating the identified one or more meeting parameters.

In some embodiments, the request includes meeting attendees and wherein the one or more meeting parameters that deviate include one or more of the meeting attendees that cannot attend the meeting. In some embodiments, the request includes a meeting time and wherein the one or more meeting parameters that deviate include the meeting time. In some embodiments, the meeting parameters include at least a meeting time, a conference room, and available attendees.

Another implementation of the present disclosure is one or more non-transitory computer-readable storage media having instructions stored thereon that, when executed by one or more processors, cause the one or more processors to receive a request to hold a meeting in a building from a meeting host, the request including meeting parameters, retrieve context information corresponding to the meeting host, wherein the context information includes historical meeting parameters, compare the historical meeting parameters to the meeting parameters, and transmit a notification to the meeting host based on the comparison.

In some embodiments, the meeting parameters include meeting attendees, wherein the historical meeting parameters include historical meeting attendees, and wherein the notification is transmitted in response to a difference between the meeting attendees and the historical meeting attendees. In some embodiments, the meeting parameters include a conference room, wherein the historical meeting parameters include a historical conference room, and wherein the notification is transmitted in response to a difference between the conference room and the historical conference room. In some embodiments, the computing device is further configured to dynamically generate one or more additional meeting parameters based on the context information. In some embodiments, the meeting parameters include a meeting type and wherein the one or more additional meeting parameters include at least one of meeting attendees, a conference room, or a meeting time. In some embodiments, the one or more additional meeting parameters include a food/beverage order. In some embodiments, the one or more additional meeting parameters include a technology request, wherein the technology request includes one or more devices to be used during the meeting. In some embodiments, the historical meeting parameters are based on previous meetings hosted by the meeting host.

Another implementation of the present disclosure is a method of a smart meeting system, including receiving a request to hold a meeting in a building from a meeting host, the request including meeting parameters, retrieving context information corresponding to the meeting host, wherein the context information includes historical meeting parameters, comparing the historical meeting parameters to the meeting parameters, and transmitting a notification to the meeting host based on the comparison.

In some embodiments, the meeting parameters include meeting attendees, wherein the historical meeting parameters include historical meeting attendees, and wherein the notification is transmitted in response to a difference between the meeting attendees and the historical meeting attendees. In some embodiments, the meeting parameters include a conference room, wherein the historical meeting parameters include a historical conference room, and wherein the notification is transmitted in response to a difference between the conference room and the historical conference room. In some embodiments, the computing device is further configured to dynamically generate one or more additional meeting parameters based on the context information. In some embodiments, the meeting parameters include a meeting type and wherein the one or more additional meeting parameters include at least one of meeting attendees, a conference room, or a meeting time. In some embodiments, the one or more additional meeting parameters include a food/beverage order. In some embodiments, the one or more additional meeting parameters include a technology request, wherein the technology request includes one or more devices to be used during the meeting. In some embodiments, the historical meeting parameters are based on previous meetings hosted by the meeting host.

Another implementation of the present disclosure is a building management system (BMS), including one or more processing circuits and one or more computer readable storage media, the one or more computer readable storage media having instructions stored thereon that, when executed by the one or more processing circuits, cause the one or more processing circuits to receive a request to hold a meeting in a building from a meeting host, the request including meeting parameters, retrieve context information corresponding to the meeting host, wherein the context information includes historical meeting parameters, compare the historical meeting parameters to the meeting parameters, and transmit a notification to the meeting host based on the comparison.

In some embodiments, the meeting parameters include meeting attendees, wherein the historical meeting parameters include historical meeting attendees, and wherein the notification is transmitted in response to a difference between the meeting attendees and the historical meeting attendees. In some embodiments, the meeting parameters include a conference room, wherein the historical meeting parameters include a historical conference room, and wherein the notification is transmitted in response to a difference between the conference room and the historical conference room. In some embodiments, the computing device is further configured to dynamically generate one or more additional meeting parameters based on the context information.

Another implementation of the present disclosure is one or more non-transitory computer-readable storage media having instructions stored thereon that, when executed by one or more processors, cause the one or more processors to receive a request to hold a meeting in a building, the request including a first parameter associated with a first dimension, retrieve context information corresponding to an attendee of the meeting, wherein a subset of the context information is associated with the first dimension, determine a second parameter associated with the first dimension based on the subset of the context information, and update the meeting request to include the second parameter.

In some embodiments, the first dimension is time, and wherein the subset of the context information includes historical actions of the attendee. In some embodiments, the historical actions of the attendee include historical food/beverage orders of the attendee, and wherein the second parameter is a food/beverage order determined based on the historical food/beverage orders of the attendee. In some embodiments, the food/beverage order is associated with a time of the meeting. In some embodiments, updating the meeting request includes transmitting the food/beverage order to a food/beverage provider. In some embodiments, the first dimension is physical location, and wherein the subset of the context information includes locations within the building. In some embodiments, the second parameter is a conference room within the building, and wherein the conference room is determined based on the locations within the building.

Another implementation of the present disclosure is a method of a smart meeting system, including receiving a request to hold a meeting in a building, the request including a first parameter associated with a first dimension, retrieving context information corresponding to an attendee of the meeting, wherein a subset of the context information is associated with the first dimension, determining a second parameter associated with the first dimension based on the subset of the context information, and updating the meeting request to include the second parameter.

In some embodiments, the first dimension is time, and wherein the subset of the context information includes historical actions of the attendee. In some embodiments, the historical actions of the attendee include historical food/beverage orders of the attendee, and wherein the second parameter is a food/beverage order determined based on the historical food/beverage orders of the attendee. In some embodiments, the food/beverage order is associated with a time of the meeting. In some embodiments, updating the meeting request includes transmitting the food/beverage order to a food/beverage provider. In some embodiments, the first dimension is physical location, and wherein the subset of the context information includes locations within the building. In some embodiments, the second parameter is a conference room within the building, and wherein the conference room is determined based on the locations within the building.

Another implementation of the present disclosure is a building management system (BMS), including one or more processing circuits and one or more computer readable storage media, the one or more computer readable storage media having instructions stored thereon that, when executed by the one or more processing circuits, cause the one or more processing circuits to receive a request to hold a meeting in a building, the request including a first parameter associated with a first dimension, retrieve context information corresponding to an attendee of the meeting, wherein a subset of the context information is associated with the first dimension, determine a second parameter associated with the first dimension based on the subset of the context information, and update the meeting request to include the second parameter.

In some embodiments, the first dimension is time, and wherein the subset of the context information includes historical actions of the attendee. In some embodiments, the historical actions of the attendee include historical food/beverage orders of the attendee, and wherein the second parameter is a food/beverage order determined based on the historical food/beverage orders of the attendee. In some embodiments, the food/beverage order is associated with a time of the meeting. In some embodiments, updating the meeting request includes transmitting the food/beverage order to a food/beverage provider. In some embodiments, the first dimension is physical location, and wherein the subset of the context information includes locations within the building.

Another implementation of the present disclosure is one or more non-transitory computer-readable storage media having instructions stored thereon that, when executed by one or more processors, cause the one or more processors to receive a request to hold a meeting in a building from a meeting host, the request including meeting parameters, retrieve context information corresponding to the meeting host, generate a metric describing a productivity associated with the meeting based on the meeting parameters and the context information, dynamically determine suggested parameters for the meeting based on the metric, and transmit a notification to the meeting host including the suggested parameters for the meeting.

In some embodiments, the meeting parameters include a meeting time. In some embodiments, wherein the context information includes historical feedback from the meeting host associated with meetings associated with the meeting time. In some embodiments, the context information includes a schedule of the meeting host having events, and wherein dynamically determining the suggested parameters for the meeting includes determining a different meeting time for the meeting based on the schedule and the meeting time. In some embodiments, the context information includes user preferences associated with the meeting host, and wherein dynamically determining the suggested parameters for the meeting includes determining a different meeting time for the meeting based on the user preferences and the meeting time. In some embodiments, the context information includes a schedule of the meeting host having events, and wherein dynamically determining the suggested parameters for the meeting includes determining a food and/or beverage order based on the schedule and the meeting time. In some embodiments, the meeting parameters include a meeting duration, and wherein the context information includes feedback associated with an effectiveness of previous meetings having the meeting duration, and wherein dynamically determining the suggested parameters for the meeting includes determining a different meeting duration based on the meeting duration, the effectiveness of the previous meetings, and the meeting time. In some embodiments, the context information includes one or more individuals, and wherein dynamically determining the suggested parameters for the meeting includes determining attendees for the meeting based on the one or more individuals.

Another implementation of the present disclosure is a method of a smart meeting system, including receiving a request to hold a meeting in a building from a meeting host, the request including meeting parameters, retrieving context information corresponding to the meeting host, generating a metric describing a productivity associated with the meeting based on the meeting parameters and the context information, dynamically determining suggested parameters for the meeting based on the metric, and transmitting a notification to the meeting host including the suggested parameters for the meeting.

In some embodiments, the meeting parameters include a meeting time. In some embodiments, the context information includes historical feedback from the meeting host associated with meetings associated with the meeting time. In some embodiments, the context information includes a schedule of the meeting host having events, and wherein dynamically determining the suggested parameters for the meeting includes determining a different meeting time for the meeting based on the schedule and the meeting time. In some embodiments, the context information includes user preferences associated with the meeting host, and wherein dynamically determining the suggested parameters for the meeting includes determining a different meeting time for the meeting based on the user preferences and the meeting time. In some embodiments, the context information includes a schedule of the meeting host having events, and wherein dynamically determining the suggested parameters for the meeting includes determining a food and/or beverage order based on the schedule and the meeting time. In some embodiments, the meeting parameters include a meeting duration, and wherein the context information includes feedback associated with an effectiveness of previous meetings having the meeting duration, and wherein dynamically determining the suggested parameters for the meeting includes determining a different meeting duration based on the meeting duration, the effectiveness of the previous meetings, and the meeting time. In some embodiments, the context information includes one or more individuals, and wherein dynamically determining the suggested parameters for the meeting includes determining attendees for the meeting based on the one or more individuals.

Another implementation of the present disclosure is a building management system (BMS), including one or more processing circuits and one or more computer readable storage media, the one or more computer readable storage media having instructions stored thereon that, when executed by the one or more processing circuits, cause the one or more processing circuits to receive a request to hold a meeting in a building from a meeting host, the request including meeting parameters, retrieve context information corresponding to the meeting host, generate a metric describing a productivity associated with the meeting based on the meeting parameters and the context information, dynamically determine suggested parameters for the meeting based on the metric, and transmit a notification to the meeting host including the suggested parameters for the meeting.

In some embodiments, the meeting parameters include a meeting time. In some embodiments, the context information includes historical feedback from the meeting host associated with meetings associated with the meeting time. In some embodiments, the context information includes a schedule of the meeting host having events, and wherein dynamically determining the suggested parameters for the meeting includes determining a different meeting time for the meeting based on the schedule and the meeting time.

Another implementation of the present disclosure is one or more non-transitory computer-readable storage media having instructions stored thereon that, when executed by one or more processors, cause the one or more processors to in response to receiving an indication that a first meeting has ended, transmit a survey to attendees of the first meeting, receive, from the attendees, the survey, wherein the received survey includes feedback from the attendees, receive a request to hold a second meeting, the request including at least one of the attendees, and dynamically determine meeting parameters based on the feedback.

In some embodiments, the feedback includes a measure of the first meeting effectiveness, wherein the first meeting effectiveness describes a quality of the first meeting. In some embodiments, the feedback further includes a rating of at least one of a conference room of the first meeting, an environmental condition of the first meeting, or a technology capacity of the first meeting. In some embodiments, the rating of the conference room includes a rating of a location of the conference room. In some embodiments, the rating of the conference room includes a rating of a size of the conference room. In some embodiments, the feedback further includes a free text field. In some embodiments, dynamically determining meeting parameters includes determining attendees of the second meeting based on the measure of the first meeting effectiveness. In some embodiments, dynamically determining meeting parameters includes determining a conference room of the second meeting based on the measure of the first meeting effectiveness. In some embodiments, dynamically determining meeting parameters includes determining an environmental condition of a conference room of the second meeting based on the measure of the first meeting effectiveness. In some embodiments, dynamically determining meeting parameters includes determining a technology resource of the second meeting based on the measure of the first meeting effectiveness.

Another implementation of the present disclosure is a method of a smart meeting system, including in response to receiving an indication that a first meeting has ended, transmitting a survey to attendees of the first meeting, receiving, from the attendees, the survey, wherein the received survey includes feedback from the attendees, receiving a request to hold a second meeting, the request including at least one of the attendees, and dynamically determining meeting parameters based on the feedback.

In some embodiments, the feedback includes a measure of the first meeting effectiveness, wherein the first meeting effectiveness describes a quality of the first meeting. In some embodiments, the feedback further includes a rating of at least one of a conference room of the first meeting, an environmental condition of the first meeting, or a technology capacity of the first meeting. In some embodiments, the rating of the conference room includes a rating of a location of the conference room. In some embodiments, the rating of the conference room includes a rating of a size of the conference room. In some embodiments, the feedback further includes a free text field. In some embodiments, dynamically determining meeting parameters includes determining attendees of the second meeting based on the measure of the first meeting effectiveness. In some embodiments, dynamically determining meeting parameters includes determining a conference room of the second meeting based on the measure of the first meeting effectiveness. In some embodiments, dynamically determining meeting parameters includes determining an environmental condition of a conference room of the second meeting based on the measure of the first meeting effectiveness.

Another implementation of the present disclosure is a building management system (BMS), including one or more processing circuits and one or more computer readable storage media, the one or more computer readable storage media having instructions stored thereon that, when executed by the one or more processing circuits, cause the one or more processing circuits to in response to receiving an indication that a first meeting has ended, transmit a survey to attendees of the first meeting, receive, from the attendees, the survey, wherein the received survey includes feedback from the attendees, receive a request to hold a second meeting, the request including at least one of the attendees, and dynamically determine meeting parameters based on the feedback.

BRIEF DESCRIPTION OF THE DRAWINGS

The above and other aspects and features of the present disclosure will become more apparent to those skilled in the art from the following detailed description of the example embodiments with reference to the accompanying drawings.

Figures 10, 11:
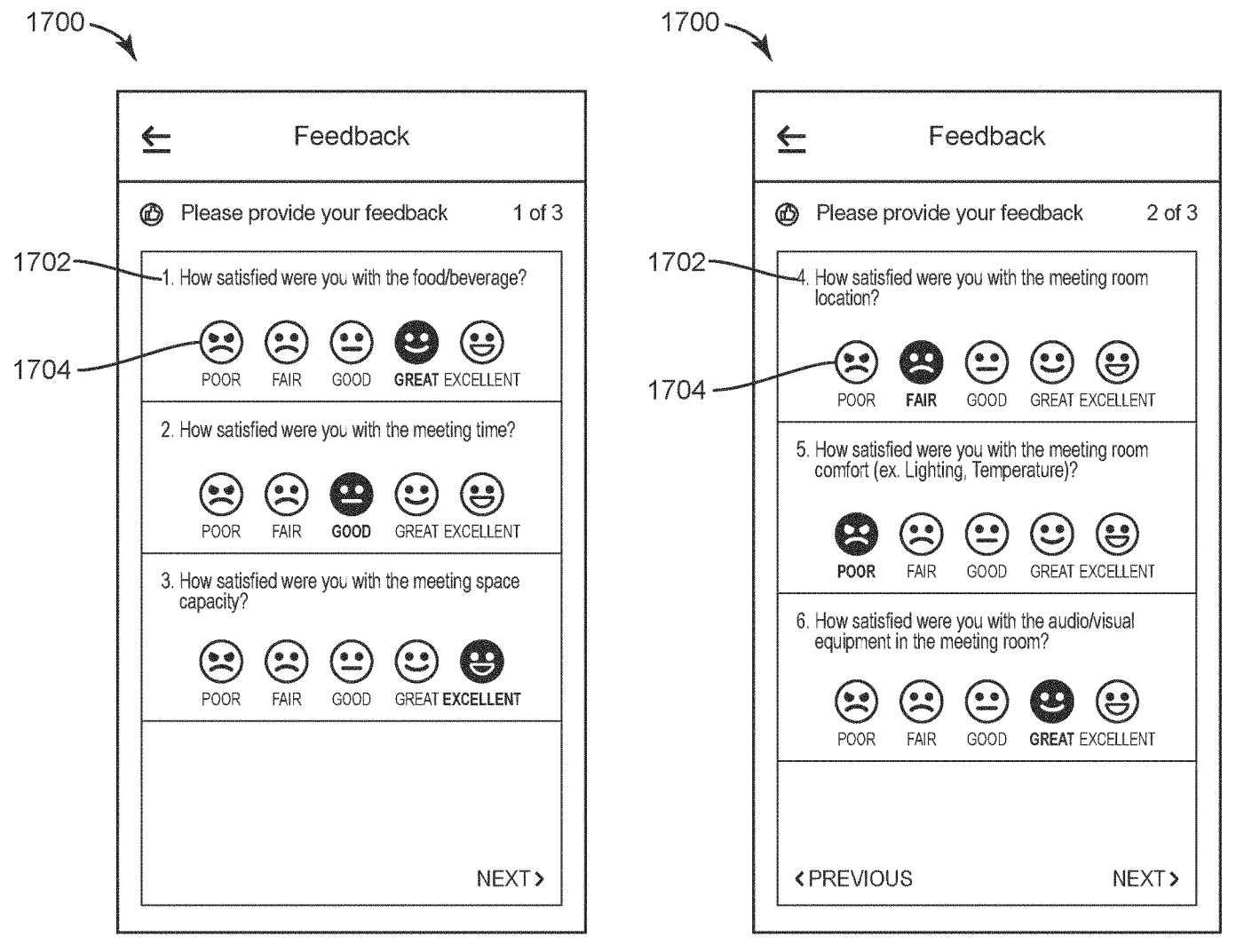

FIG. 10 is a user interface including survey questions, according to an embodiment.

FIG. 11 is another user interface including survey questions, according to an embodiment.

DETAILED DESCRIPTION

Referring generally to the FIGURES, a building system and method for providing a smart meeting room system are shown, according to various exemplary embodiments. The smart meeting room system includes a communications interface to provide for data exchange with one or more meeting rooms. The smart meeting room system includes a smart meeting system for scheduling meetings. The smart meeting system may dynamically determine meeting parameters (e.g., meeting time, conference room, etc.). The smart meeting system may query meeting attendees for feedback and adjust future meeting parameters based on the attendee feedback. For example, the smart meeting system may determine that a specific meeting attendee often causes meetings to be unproductive and may recommend that the specific meeting attendee be not included in future meetings.

Figure 1A:
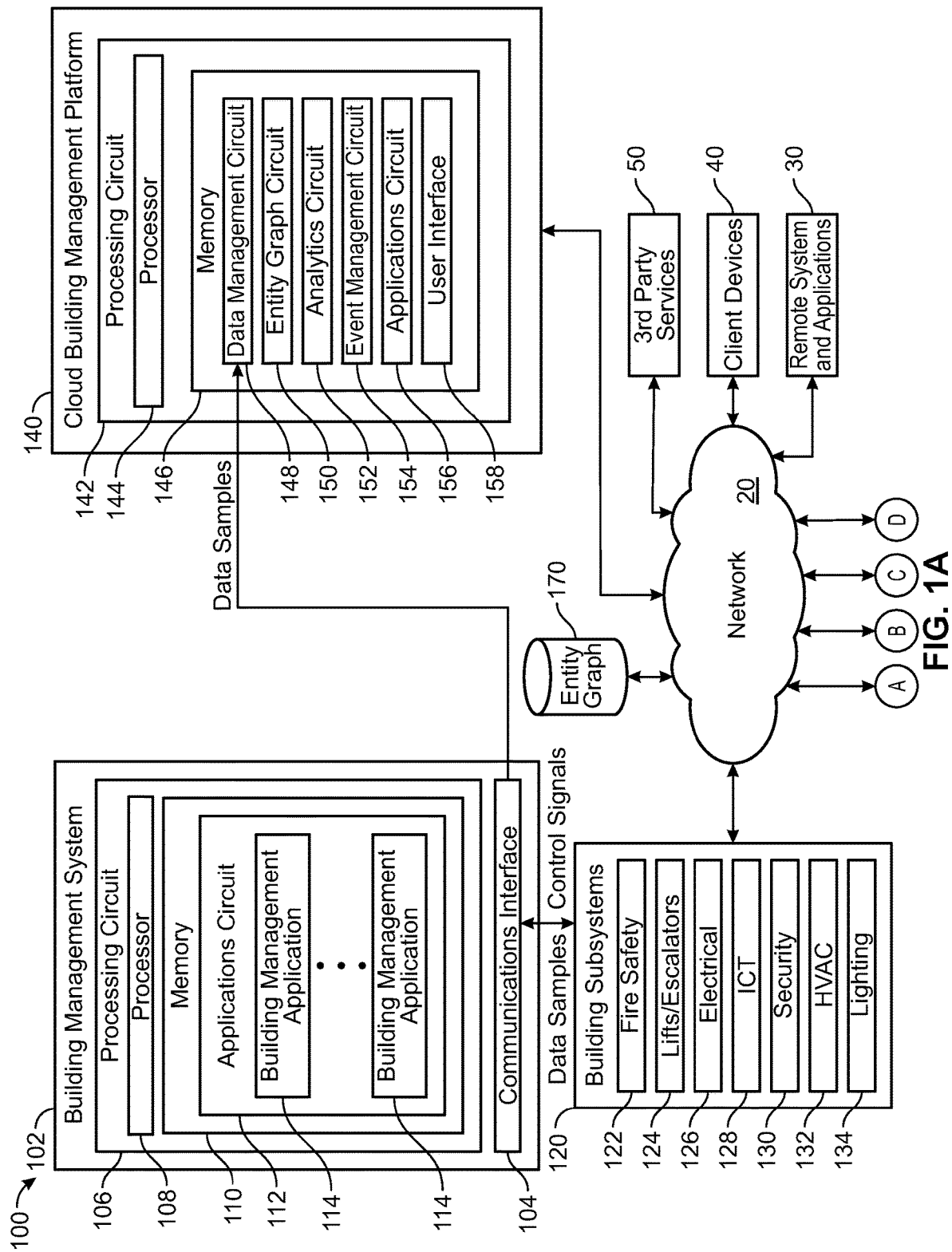
FIG. 1A is a block diagram of a smart building environment, according to an exemplary embodiment.
Figure 1B:
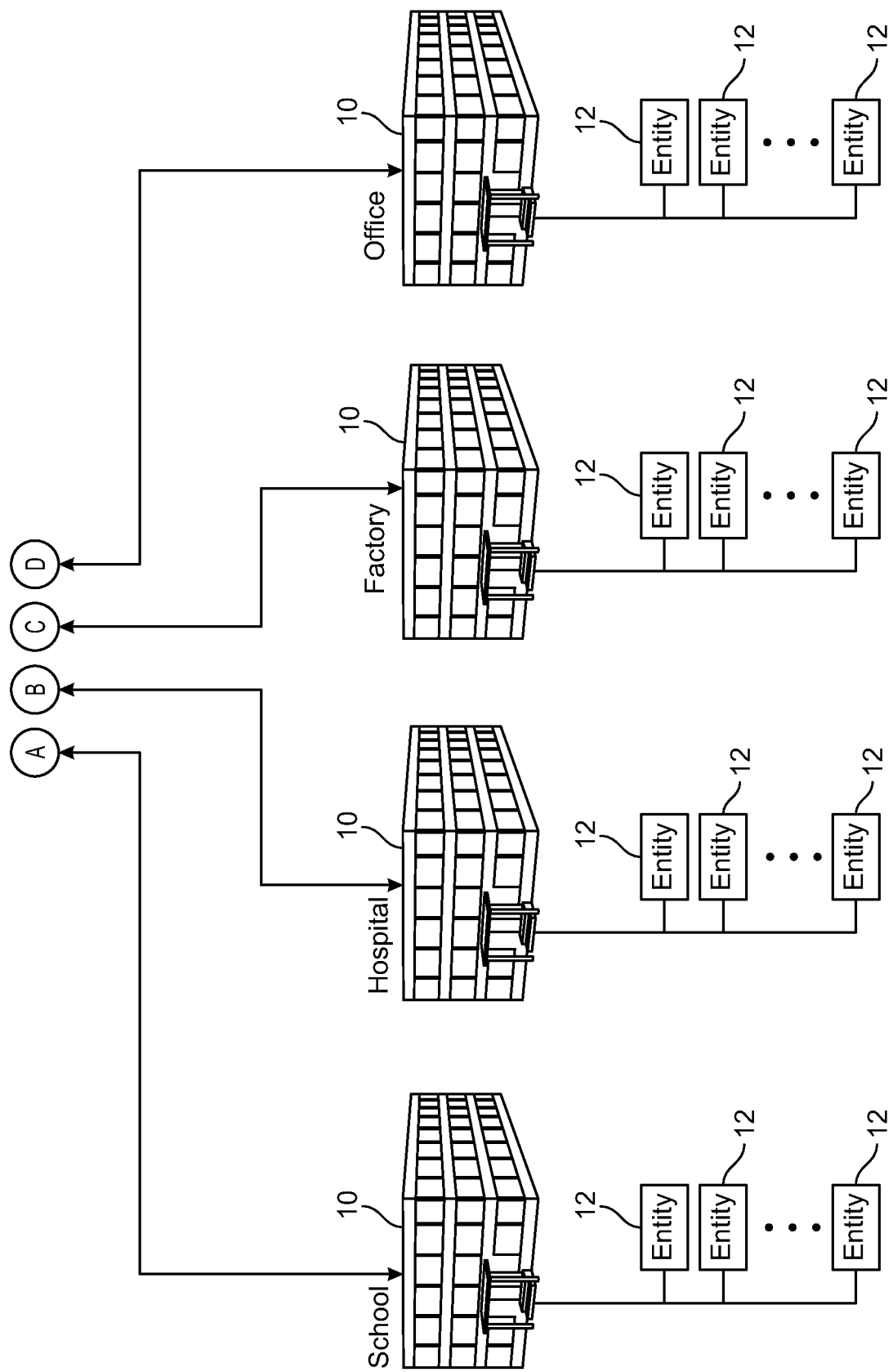
FIG. 1B is another block diagram of the smart building environment of FIG. 1A, according to an exemplary embodiment.

Hereinafter, example embodiments will be described in more detail with reference to the accompanying drawings. Referring now to FIGS. 1A-1B, a block diagram of a smart building environment 100 is shown, according to an exemplary embodiment. Smart building environment 100 is shown to include cloud building management platform 140. Cloud building management platform 140 may be configured to collect information from a variety of different data sources. Cloud management platform 140 may create digital representations, referred to as "digital twins," of physical spaces, equipment, people, and/or events based on the collected information. In various embodiments, the digital representations are stored in an entity graph. In brief overview, an entity graph is a data structure representing entities (e.g., spaces, equipment, people, events, etc.) and relationships between the entities. In various embodiments, the entity graph data structure facilitates advanced artificial intelligence and machine learning associated with the entities. In various embodiments, entities within the entity graph data structure include or are associated with "agents," or software entities configured to take actions with respect to the digital twins/real world entities with which they are associated. In some implementations, the agents may be configured to implement artificial intelligence/machine learning methodologies. The agents may be configured to facilitate communication and collection of information between the variety of different data sources. Each of the data sources may be implemented as, include, or otherwise use respective agents for facilitating communication amongst or between the data sources and cloud building management platform 140. The agents of cloud building management platform 140 and data sources may be configured to communicate using defined channels across which the agents may exchange information, messages, data, etc. amongst each other. In some examples, channels may be defined for particular spaces, subspaces, control loops, groups of equipment, people, buildings or groups of buildings, etc. In some implementations, agents may communicate by publishing messages to particular channels and subscribing to messages on particular channels and/or published by particular other agents/types of agents. In various embodiments, the data sources include buildings. For example, cloud building management platform 140 may interact with a number of buildings, each of which may include an agent (or a group of agents corresponding to various building subsystems within the respective building), to receive information. Hence, cloud building management platform 140 and the data sources may together form a network of agents to facilitate artificially intelligent exchange and communication of information across various channels. In some embodiments, one or more device(s), component(s), space(s) (and sets of devices, components, spaces) within cloud building management platform 140 may include a respective agent dedicated to perform various tasks associated therewith. The agents may therefore be dedicated for performing separate functions or tasks.

In various embodiments, cloud building management platform 140 collects data from buildings 10. For example, cloud building management platform 140 may collect data from buildings 10 such as a school, a hospital, a factory, an office building, and/or the like. It should be understood that the present disclosure is not limited to the number or types of buildings 10 shown in FIG. 1B. As new devices/components/spaces/buildings/events/control loops are added or otherwise incorporated into smart building environment 100, new digital representations (and associated agents, etc.) may be dynamically generated and incorporated into the entity graph data structure. Various examples of agents and corresponding networking may be found in U.S. patent application Ser. No. 15/934,593, filed Mar. 23, 2018, and titled "Building Management System with Dynamic Channel Communication", P.C.T. Application No. PCT/US2018/037,589, filed Jun. 14, 2018, and titled "Building Management System with Artificial Intelligence for Unified Agent Based Control of Building Subsystems," and U.S. patent application Ser. No. 16/036,685, filed Jul. 16, 2018, and titled "Systems and Methods for Agent Based Building Simulation for Optimal Control", the contents of each of which are incorporated herein by reference.

Buildings 10 may include entities 12. Entities 12 may include spaces, equipment, people, and/or events. In some embodiments, entities 12 include spaces such as floors, rooms, zones, campuses, buildings, and the like. In some embodiments, entities 12 include people such as employees, visitors, pedestrians, staff, and the like. In some embodiments, entities 12 include equipment such as inventory, assets, furniture, vehicles, building components, devices, and the like. For example, entities 12 may include devices such as internet of things (IoT) devices. IoT devices may include any of a variety of physical devices, sensors, actuators, electronics, vehicles, home appliances, and/or other items capable of communicating data over an electronic network (e.g., smart lights, smart appliances, smart home hub devices, etc.). In some embodiments, entities 12 include events such as meetings, fault indications, alarms, and the like. In various embodiments, cloud building management platform 140 receives information associated with buildings 10 and/or entities 12 and generates entity graph 170 based on the received information. Entity graph 170 may include digital twins that are digital representations of real world spaces, equipment, people, events, and/or the like. Entity graph 170 is described in greater detail below with reference to FIG. 3A-3B.

Smart building environment 100 may include building management system (BMS) 102. In various embodiments, BMS 102 communicates with cloud building management platform 140 to facilitate management and control of buildings 10 and/or the various operations described herein. BMS 102 may be configured to control, monitor, and/or manage equipment in or around a building or building area (e.g., such as buildings 10, etc.). For example, BMS 102 may include a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems. In some embodiments, each of buildings 10 is associated with a BMS 102. Additionally or alternatively, a single BMS 102 may manage multiple buildings 10. For example, a first BMS 102 may manage a first building 10, a second BMS 102 may manage a second building 10, and a third BMS 102 may manage the first and second buildings 10 (e.g., via the first and second BMS 102, in a master-slave configuration, etc.), as well as a third building 10. In various embodiments, BMS 102 communicates with building subsystems 120.

Building subsystems 120 may include fire safety subsystem 122, lift/escalators subsystem 124, building electrical subsystem 126, information communication technology (ICT) subsystem 128, security subsystem 130, HVAC subsystem 132, and/or lighting subsystem 134. In various embodiments, building subsystems 120 include fewer, additional, or alternative subsystems. For example, building subsystems 120 may additionally or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building 10. In some embodiment each of buildings 10 includes building subsystems 120. Additionally or alternatively, multiple buildings 10 may share at least some of building subsystems 120.

Each of building subsystems 120 may include any number of devices (e.g., IoT devices), sensors, controllers, and connections to facilitate functions and control activities. For example, HVAC subsystem 132 may include a chiller, a boiler, any number of air handling units, economizers, field controllers, supervisory controllers, actuators, temperature sensors, and other devices for controlling the temperature, humidity, airflow, or other variable conditions within buildings 10. Lighting subsystem 134 may include any number of light fixtures, ballasts, lighting sensors, dimmers, or other devices configured to controllably adjust the amount of light provided to a building space. Security subsystem 130 may include occupancy sensors, video surveillance cameras, digital video recorders, video processing servers, intrusion detection devices, access control devices and servers, or other security-related devices.

Cloud building management platform 140 and/or BMS 102 may interact with a variety of external systems. For example, cloud building management platform 140 may interact with remote systems and applications 30, client devices 40, and/or third party services 50. In various embodiments, systems and/or components of smart building environment 100 are configured to communicate using network 20. Network 20 may include hardware, software, or any combination thereof.

BMS 102 is shown to include communications interface 104 and processing circuit 106. Communications interface 104 may facilitate communications between BMS 102 and external systems/applications (e.g., cloud building management platform 140, remote systems and applications 30, client devices 40, third party services 50, building subsystems 120, etc.). Communications interface 104 may be or include wired or wireless communications interfaces (e.g., jacks, antennas, transmitters, receivers, transceivers, wire terminals, etc.) for conducting data communications within smart building environment 100 and/or with other external systems or devices. In various embodiments, communications via communications interface 104 is direct (e.g., local wired or wireless communications). Additionally or alternatively, communications via communications interface 104 may be via network 20 (e.g., a WAN, the Internet, a cellular network, etc.). For example, cloud building management platform 140 may communicate with BMS 102 using a wired connection and may communicate with client devices 40 (e.g., via BMS 102, etc.) using a cellular connection (e.g., a 4G or 5G access point/small cell base station, etc.). As a further example, communications interface 104 may include an Ethernet card and port for sending and receiving data via an Ethernet-based communications link or network. As a further example, communications interface 104 may include a Wi-Fi transceiver for communicating via a wireless communications network. As yet a further example, communications interface 104 may include cellular or mobile phone communications transceivers.

Processing circuit 106 may include processor 108 and memory 110. Processing circuit 106 may be communicably connected to communications interface 104 such that processing circuit 106 and the various components thereof can send and receive data via communications interface 104. Processor 108 may be implemented as a general purpose processor, an application specific integrated circuit (ASIC), one or more field programmable gate arrays (FPGAs), a group of processing components, or other suitable electronic processing components.

Memory 110 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 110 may be or include volatile memory or non-volatile memory. Memory 110 may include database components, object code components, script components, or any other type of information structure for supporting the various activities and information structures described in the present application. According to some embodiments, memory 110 is communicably connected to processor 108 via processing circuit 106 and includes computer code for executing (e.g., by processing circuit 106 and/or processor 108) one or more of the operations described herein.

In some embodiments, BMS 102 and/or cloud building management platform 140 are implemented within a single computer (e.g., one server, one housing, etc.). In various other embodiments BMS 102 and/or cloud building management platform 140 are distributed across multiple servers or computers (e.g., that can exist in distributed locations). In some embodiments, functions of BMS 102 and/or cloud building management platform 140 are implemented as agents. For example, BMS 102 may include a fault detection agent configured to analyze building data and detect faults associated with building components.

Memory 110 may include applications circuit 112 that may include building management application(s) 114. Building management application(s) 114 may include various systems to monitor and/or control specific processes/events within buildings 10. For example, building management application(s) 114 may include automated measurement and validation (AM&V), demand response (DR), fault detection and diagnostics (FDD), integrated control systems, and/or a building subsystem integration system. Building management application(s) 114 may be configured to receive inputs from building subsystems 120 and/or other data sources, determine improved and/or optimal control actions for building subsystems 120 based on the inputs, generate control signals based on the improved and/or optimal control actions, and provide the generated control signals to building subsystems 120.

Cloud building management platform 140 is shown to include processing circuit 142 having processor 144 and memory 146. In some embodiments, cloud building management platform 140 includes multiple processing circuits 142 each having one or more processors 144 and/or memories 146. Processor 144 may be a general purpose or specific purpose processor, an application specific integrated circuit (ASIC), one or more field programmable gate arrays (FPGAs), a group of processing components, or other suitable processing components. Processor 144 may be configured to execute computer code or instructions stored in memory 146 or received from other computer readable media (e.g., CDROM, network storage, a remote server, etc.).

Memory 146 may include one or more devices (e.g., memory units, memory devices, storage devices, etc.) for storing data and/or computer code for completing and/or facilitating the various processes described in the present disclosure. Memory 146 may include random access memory (RAM), read-only memory (ROM), hard drive storage, temporary storage, non-volatile memory, flash memory, optical memory, or any other suitable memory for storing software objects and/or computer instructions. Memory 146 may include database components, object code components, script components, or any other type of information structure for supporting the various activities and information structures described in the present disclosure. According to some embodiments, memory 146 is communicably connected to processor 144 via processing circuit 142 and includes computer code for executing (e.g., by processing circuit 142 and/or processor 144) one or more of the operations described herein.

Memory 146 may include data management circuit 148, entity graph circuit 150, analytics circuit 152, event management circuit 154, applications circuit 156, and/or user interface circuit 158. Data management circuit 148 may be configured to collect, manage, and/or retrieve data. In various embodiments, data management circuit 148 receives data samples from buildings 10 (e.g., via BMS 102, directly, etc.) and stores the data samples in structured storage. For example, the data samples may include data values for various data points. The data values may be measured and/or calculated values, depending on the type of data point. For example, a data point received from a temperature sensor may include a measured data value indicating a temperature measured by the temperature sensor. Data management circuit 148 may receive data samples from systems, components, and/or devices (e.g., IoT devices, sensors, etc.) within smart building environment 100 (e.g., remote systems and applications 30, client devices 40, third party services 50, BMS 102, building subsystems 120, etc.) and/or from external systems (e.g., the Internet, etc.). For example, data management circuit 148 may receive timeseries data from an occupancy sensor associated with one of buildings 10 and facilitate storage of the timeseries data in structured storage (e.g., in entity graph 170, etc.). As a further example, data management circuit 148 may receive an electronic calendar event (e.g., a meeting invitation, etc.) from one of client devices 40 and facilitate storage of the electronic calendar event in structure storage (e.g., in entity graph 170, etc.). In some embodiments, data management circuit 148 uses or retrieves an entity graph (e.g., via entity graph circuit 150, etc.) when organizing received data.

Entity graph circuit 150 may be configured to manage entity graph 170. In various embodiments, entity graph circuit 150 registers and manages various buildings (e.g., building 10, etc.), spaces, persons, subsystems (e.g., building subsystems 120, etc.), devices (e.g., IoT devices, etc.), events, and/or other entities in cloud building management platform 140. As described above, an entity may be any person, place, space, physical object, equipment, or the like. Further, an entity may be any event, data point, record structure, or the like. Entities and entity graph 170 are described in detail below with reference to FIGS. 3A-3B.

Analytics circuit 152 may be configured to analyze data to generate results. For example, analytics circuit 152 may analyze sensor data (e.g., weight measurements, image data, audio data, etc.) from a building lobby to identify a user. As a further example, analytics circuit 152 may apply fault detection rules to timeseries data from an HVAC system to detect a fault associated with the HVAC system. In various embodiments, analytics circuit 152 performs operations on information stored in entity graph 170. For example, analytics circuit 152 may traverse entity graph 170 to retrieve context information (e.g., energy usage, event activity, occupancy sensor data, HVAC control schedules, etc.) associated with one of buildings 10, and analyze the context information to determine a user schedule associated with the building (e.g., when the building is most heavily in use, etc.).

Event management circuit 154 may be configured to generate actions. For example, event management circuit 154 may receive event data from building subsystems 120 (e.g., a security alarm, etc.), and generate a response based on the event data (e.g., cause BMS 102 to sound an alarm, etc.). In various embodiments, event management circuit 154 generates actions dynamically. For example, event management circuit 154 may include artificially intelligent agents configured to generate actions in real-time based on received input. For example, event management circuit 154 may include an AI agent that dynamically generates a notification to an interested party in response to receiving an indication of an identified individual. As a further example, event management circuit 154 may receive a prediction from analytics circuit 152 that a building component is about to enter a fault state and may dynamically generate a work order ticket for the building component in response to the received prediction.

Applications circuit 156 may be configured to facilitate a variety of applications associated with cloud building management platform 140. For example, applications circuit 156 may facilitate a smart messaging system, a personal comfort system, a health and wellness system, a smart parking lot system, a smart signage system, a smart lobby system, a smart meeting room system, an employee productivity system, and/or the like. In various embodiments, applications circuit 156 facilitates operation of various systems that integrate with smart building environment 100. For example, applications circuit 156 may facilitate a FDD system that receives data from buildings 10 and generates fault indications associated with buildings 10.

User interface 158 may be configured to facilitate user interaction with cloud building management platform 140 and/or BMS 102. For example, a user may update personalized preferences associated with operation of cloud building management platform 140 via user interface 158. In some embodiments, user interface 158 facilitates dynamic feedback (e.g., a natural user interface, etc). For example, user interface 158 may facilitate chatbot interaction, voice commands, user authentication, biometric feedback, or the like.

Figure 2:
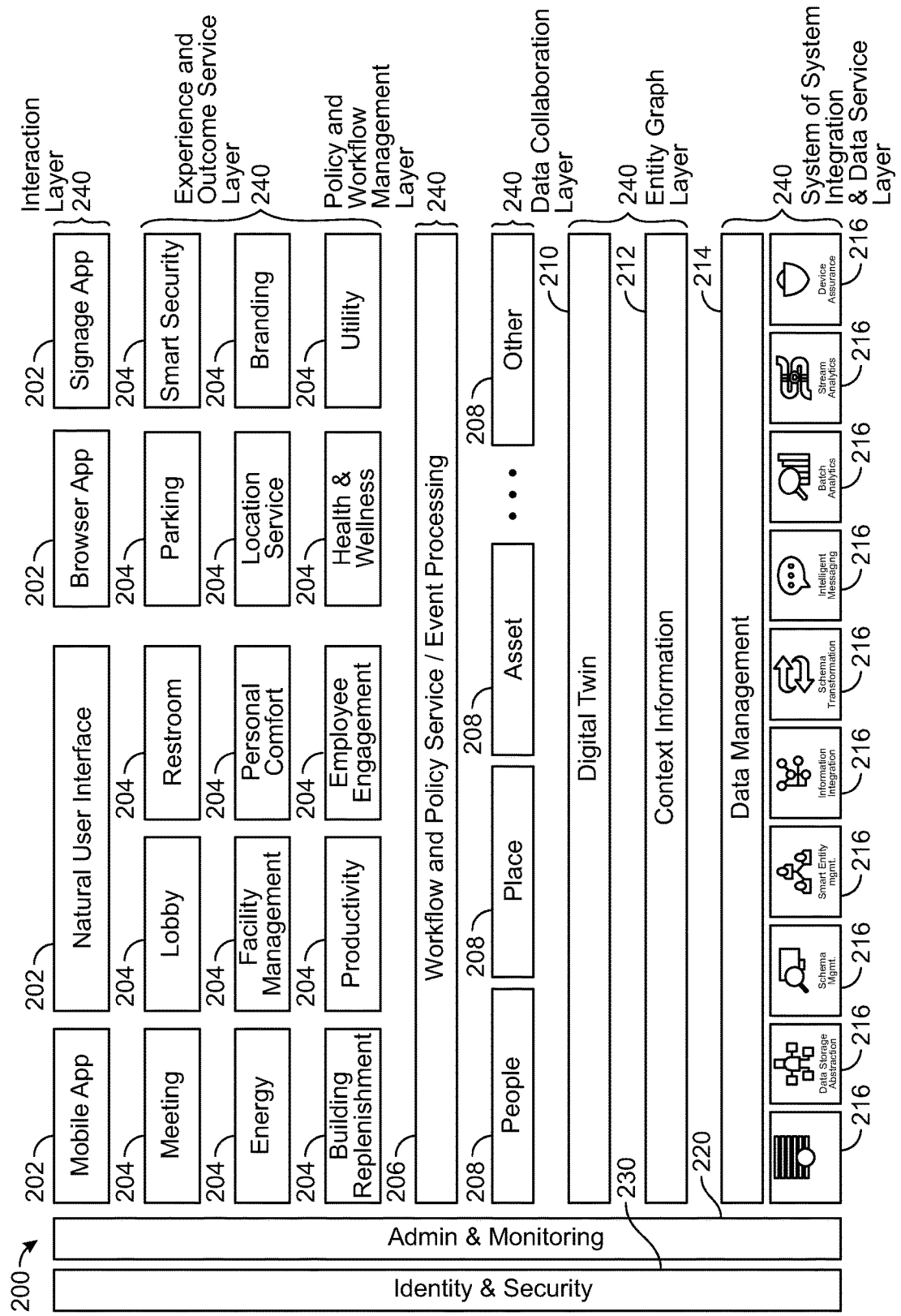
FIG. 2 is a block diagram of a building data platform associated with the smart building environment of FIGS. 1A-1B, according to an exemplary embodiment.

Referring now to FIG. 2, a building data platform 200 associated with the smart building environment 100 is shown, according to an exemplary embodiment. In various embodiments, cloud building management platform 140 implements the architecture of building data platform 200. Building data platform 200 is shown to include various layers 240. For example, layers 240 may include an interaction layer, an experience and outcome service layer, a policy and workflow management layer, data collaboration layer, entity graph layer, and/or a system of system integration and data service layer. In various embodiments, building data platform 200 includes interface(s) 202. For example, interface(s) 202 may include a mobile phone application, a natural user interface (e.g., voice recognition, chatbot services, text recognition, etc.), a browser application, a signage system, and/or the like. Interface(s) 202 may facilitate human-to-machine interaction, information visualization, and user experience functions.

In various embodiments, building data platform 200 includes service(s) 204. Service(s) 204 may include various user deliverables (e.g., outcomes, experiences, etc.) facilitated by building data platform 200. For example, service(s) 204 may include meeting scheduling, energy management, building supplies replenishment, lobby management (e.g., tracking a number of individuals in a building lobby and responding based on the number of individuals, etc.), facility management, productivity features (e.g., measuring and reporting on employee productivity, generating productivity suggestions, etc.), restroom management (e.g., monitoring a cleanliness of building restrooms, etc.), personal comfort management (e.g., adjusting building parameters based on occupant comfort preferences, etc.), employee engagement features (e.g., monitoring and reporting on employee engagement, generating engagement suggestions, etc.), parking management (e.g., dynamically assigning parking spaces, etc.), location services (e.g., generating actions based on users' locations, etc.), health and wellness features (e.g., monitoring and reporting on employee health and wellness, generating health and wellness suggestions, etc.), smart security (e.g., dynamically identifying individuals within a building, monitoring security parameters associated with a building, etc.), branding features (e.g., dynamic digital signage updating based on an identity of a viewer, etc.), and/or utility features (e.g., monitoring and reporting on building utility usage, generating suggestions to reduce utility consumption and/or cost, etc.). In various embodiments, service(s) 204 generate a virtual view of data from data collaboration, business workflows, and downstream sub-systems (e.g., sensors, actuators, etc.).

In various embodiments, building data platform 200 includes event processing 206. Event processing 206 may facilitate generating actions based on received data. For example, event processing 206 may receive an indication of an event within buildings 10, retrieve information associated with the event, and trigger a set of predefined workflows to perform management policies. In various embodiments, event processing 206 includes complex event processing and/or a business workflow processing engine (e.g., a rules engine, etc.) integrated with messaging and data models (e.g., event data models, etc.).

In various embodiments, building data platform 200 includes data source(s) 208. For example, data source(s) 208 may include data associated with people, places, assets, and/or the like. In various embodiments, building data platform 200 interacts with digital twins included in entity graph 170. For example, building data platform 200 may project a digital twin into a virtual data view to facilitate service(s) 204. Data source(s) 208 may manage a database view of digital representation of people, places and assets. In various embodiments, data source(s) 208 represent heterogenous source data schema as an open source common data model (e.g., a Brick Schema/extensions, etc.).

In various embodiments, entity graph layer 240 includes digital twin 210 and context information 212. Digital twin 210 is a digital representation of spaces, assets, people, events, and/or anything associated with a building or operation thereof. In various embodiments, digital twin 210 is modeled in entity graph 170. In various embodiments, digital twins 210 include an active compute process. For example, a digital twin 210 may communicate with other digital twins 210, and to sense, predict and acts. In various embodiments, digital twin 210 is generated dynamically. For example, a digital twin 210 corresponding to a conference room may update its status by looking at occupancy sensors or an electronic calendar (e.g., to turn its status "available" if there is no show, etc.). In various embodiments, digital twin 210 and/or entity graph 170 include context information 212. Context information 212 may include real-time data and a historical record of each system in the environment (e.g., campus, building, facility, space, etc.). Context information 212 may be stored in entity graph 170. In various embodiments, context information 212 facilitates flexible data modeling for advanced analytics and AI application in scenarios that model highly interconnected entities.

In various embodiments, building data platform 200 includes data management 214 and/or operation(s) 216. Data management 214 may manage, retrieve, and transmit data to various systems. For example, data management 214 may retrieve and transmit data integration protocols to OT sub-systems. Operation(s) 216 may include data storage attribution, schema management, smart entity management, information integration, schema transformation, intelligent messaging, batch analytics, stream analysis, and/or device assurance.

In various embodiments, building data platform 200 includes administration and monitoring 220 and/or identity and security 230. Administration and monitoring 220 may facilitate various administrative functions and/or operations.

For example, an administrator may view memory allocation analytics associated with building data platform 200 (e.g., how much memory does entity graph 170 occupy, etc.). Identity and security 230 may facilitate various security features. For example, identity and security 230 may encrypt personally identifiable information (PII) included in digital twin 210.

Figure 3A:
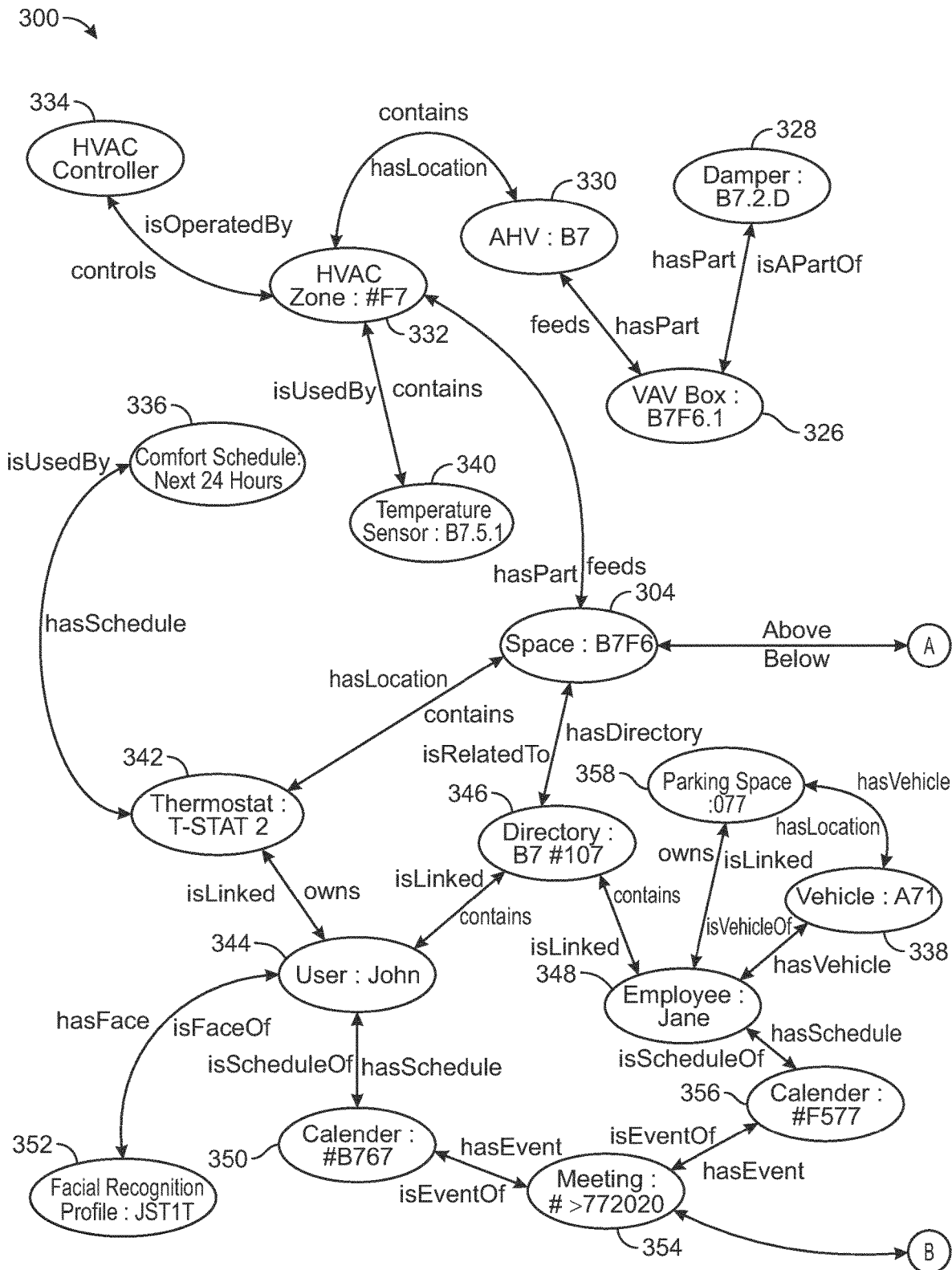
FIG. 3A is a block diagram of an entity graph, according to an exemplary embodiment.
Figure 3B:
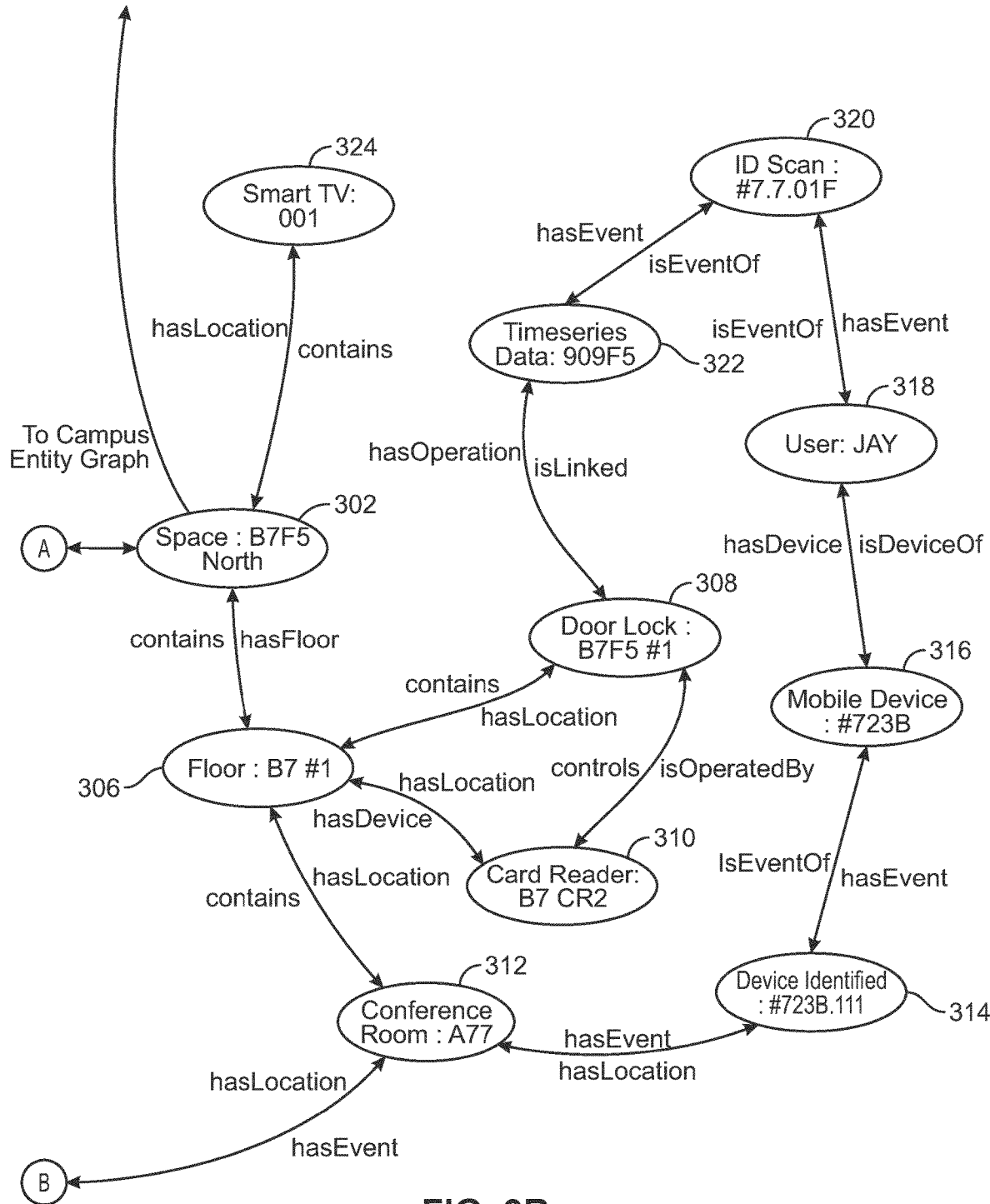
FIG. 3B is another block diagram of the entity graph of FIG. 3A, according to an exemplary embodiment.

Referring now to FIGS. 3A-3B, an entity graph 300 is shown in greater detail, according to an exemplary embodiment. In brief overview, entity graphs such as entity graph 170 and/or entity graph 300 are structured data stored in memory (e.g., a database, memory 146, etc.). Entity graphs such as entity graph 300 and/or entity graph 170 may include digital twins. Digital twins may be digital representations of real world spaces, equipment, people, and/or events. In various embodiments, digital twins represent buildings, building equipment, people associated with buildings, and/or events associated with buildings (e.g., buildings 10, etc.). An entity graph may include nodes and edges, where each node of the entity graph represents an entity and each edge is directed (e.g., from a first node to a second node) and represents a relationship between entities (e.g., indicates that the entity represented by the first node has a particular relationship with the entity represented by the second node). For example, an entity graph may be used to represent a digital twin of a person.

Entities can be things and/or concepts related to spaces, people, and/or asset. For example, the entities could be "B7F4 North", "Air Handling Unit," and/or "meeting room." The nodes can represent nouns while the edges can represent verbs. For example, the edges can be "isA," "hasPart," and/or "feeds." In various embodiments, the edges represent relationships. While the nodes represent the building and its components, the edges describe how the building operates. The nodes and edges together create a digital twin of a particular building. In some embodiments, the entities include properties or attributes describing the entities (e.g., a thermostat may have a particular model number attribute). The components of the entity graph form large networks that encode semantic information for a building.

The entity graph is configured to enable flexible data modeling for advanced analytics, control, and/or artificial intelligence applications, in some embodiments. These applications may require, or benefit from information modeling including interconnected entities. Other data modeling techniques based on a table, a hierarchy, a document, and/or a relational database may not be applicable. The entity graph can be a foundational knowledge management layer to support other higher level applications, which can be, complex root cause, impact analysis, building powerful recommendation engines, product taxonomy information services, etc. Such a multilayer system, a system of system topologies, can benefit from an underlying entity graph.

The entity graph can be a data contextualization layer for all traditional and/or artificial intelligence applications. The entity graph can be configured to capture evidence that can be used to attribute the strengths of entity relationships within the entity graph, providing the applications which utilize the entity graph with context of the systems they are operating. Without context (e.g., who the user is, what the user is looking for, what the target of a user request is, e.g., find a meeting room, increase a temperature in my office) these applications may never reach their full potential. Furthermore, the entity graph provides a native data structure for constructing question and answer type systems, e.g., a chatbot, that can leverage and understand intent.

The entity graph may not be a configuration database but may be a dynamic representation of a space, person, event, and the like. The entity graph can include operational data from entities which it represents, e.g., sensors, actuators, card access systems, occupancy of a particular space, thermodynamics of the space as a result of actuation, etc. The entity graph can be configured to continually, and/or periodically, ingest new data of the space and thus the entity graph can represent a near real-time status of cyber-physical entities and their inter-relationships. For this reason, artificial intelligence can be configured to introduce a virtual entity and new semantic relationships among entities, in some embodiments.

The entity graph is configured to facilitate adaptive controls, in some embodiments. The entity graph can be configured to adapt and learn over time. The entity graph can be configured to enable dynamic relationships between building information and other facility and enterprise systems to create new insights and drive new optimization capabilities for artificial intelligence systems. As relationships can be learned over time for the entity graph, the artificial intelligence systems and also learn overtime based on the entity graph. Entity graphs (e.g., space graphs, etc.) are described in greater detail with reference to U.S. patent application Ser. No. 16/260,078, filed on Jan. 28, 2019, the entire disclosure of which is incorporated by reference herein.

Entity graph 300 includes entities 302-358 (stored as nodes within entity graph 300) describing spaces, equipment, events, and people (e.g., business employees, etc.). In various embodiments, entities 302-358 are associated with or otherwise include agents (e.g., agents may be assigned to/associated with entities, etc.). Additionally or alternatively, agents may be represented as nodes in entity graph 300 (e.g., agent entities, etc.). Furthermore, relationships are shown between entities 302-358 directionally describing relationships between two of entities 302-358 (stored as edges within entity graph 300). In various embodiments, cloud building management platform 140 may traverse entity graph 300 to retrieve a description of what types of actions to take for a certain device, what the current status of a room is (e.g., occupied or unoccupied), etc.

As an example, entity graph 300 illustrates an office space called "B7F5 North" of a building. A smart TV referred to as "Smart TV 001" has a directional relationship to the space referred to as "B7F5 North." The relationship may be an edge "hasLocation" indicating that the device (e.g., the smart TV represented by entity 324) has a location (e.g., the space represented by entity 302). Furthermore, a second edge "contains" from entity 302 to entity 324 indicates that the location (e.g., the space represented by entity 302) includes the device (e.g., the smart TV represented by entity 324). In some embodiments, entity graph circuit 150 generates the nodes of entity graph 300 from various data sources including a building automation system, a security system, a fire alarm, human resources system, and/or building information model (BIM) files (e.g., through an entity name matching process, etc.). Furthermore, semantic relationships may be extracted from the building information by entity graph circuit 150. In some embodiments, only a single relationship exists between entities. In some embodiments, nodes and edges are determined dynamically as building data that is received and ingested into entity graph 300. For example, cloud building management platform 140 is configured to identify a door lock and card reader and generate a number of nodes and edges in entity graph 300 representing the card reader controller operation of the door lock.

Conference Room Management System

Various embodiments disclosed herein describe example implementations of a smart meeting room system. The smart meeting room system described herein may facilitate individual user experiences. For example, a smart meeting room system may dynamically generate suggested meeting parameters based on historical meeting parameters associated with a user. In some embodiments, a user may typically include five attendees for a specific type of meeting. If the user creates an instance of the specific type of meeting and forgets to include one of the five attendees, the smart meeting room system may suggest the inclusion of the forgotten attendee to the user. In various embodiments, the smart meeting room system described herein may integrate/interface with an external system (e.g., BMS 102, cloud building management platform 140, entity graph 170, etc.). For example, the smart meeting room system may reference entity graph 170 to facilitate determining during what time periods a meeting room is available for use. In some embodiments, the smart meeting room system described herein facilitates frictionless access to a campus, building, parking lot, and/or parking space for meeting visitors.

As a non-limiting example, a smart meeting room system may receive a request to hold a meeting in a building. For example, the request may include an electronic calendar invite. The smart meeting room system may retrieve user preferences associated with an attendee of the meeting. For example, the smart meeting room system may identify an attendee from an electronic calendar invite and query structured data (e.g., a database, entity graph 170, etc.) to retrieve user preferences associated with the attendee. The smart meeting room system may dynamically determine meeting parameters associated with the meeting based on the meeting request and the user preferences. For example, the smart meeting room system may dynamically determine a start and end time for the meeting based on time preferences of the user. The smart meeting room system may identify meeting parameters that deviate from the meeting request or the user preferences. For example, all meeting rooms may be booked during the period the user wishes to hold the meeting. Therefore, the smart meeting room system may find an available meeting room during a different period and notify the user of the conflict and the available meeting room. As another example, a first meeting time may work with the schedules of all but one attendee and the smart meeting room system may notify the user of the conflict with the first meeting time. In various embodiments, the smart meeting room system transmits a notification to the attendee indicating the identified meeting parameters that deviate from the request or the user preferences.

As another non-limiting example, a smart meeting room system may receive a request to hold a meeting in a building from a meeting host, the request including meeting parameters. For example, the meeting host may be an employee associated with the building and the meeting request may include a start time and an end time. The smart meeting room system may retrieve context information corresponding to the meeting host. For example, the smart meeting room system may retrieve historical meeting parameters associated with the meeting host. In some embodiments, the smart meeting room system may retrieve a start time and an end time associated with previous meetings organized by the meeting host. The smart meeting room system may compare the context information (e.g., historical meeting parameters, etc.) to the meeting parameters. For example, the smart meeting room system may compare the start time and end time associated with the meeting request to the start time and the end time associated with previous meetings organized by the meeting host. The smart meeting room system may transmit a notification to the meeting host based on the comparison. For example, the smart meeting room system may determine that a reoccurring meeting that is regularly scheduled for 10:00 AM is scheduled for 10:00 PM and may transmit a notification to the meeting host asking if they meant to schedule the meeting at 10:00 PM.

As another non-limiting example, a smart meeting room system may receive a request to hold a meeting in a building, the request including a first parameter associated with a first dimension (e.g., time, etc.). For example, the request may include an electronic calendar invite having a meeting start time. The smart meeting room system may retrieve context information corresponding to an attendee of the meeting. In various embodiments, a subset of the context information is associated with the first dimension (e.g., time, etc.). For example, the smart meeting room system may retrieve historical actions associated with the attendee. In some embodiments, the smart meeting room system may retrieve historical actions associated with the attendee that indicate that the attendee typically buys a coffee at 2:00 PM every day. The smart meeting room system may determine a second parameter associated with the first dimension based on the subset of the context information associated with the first dimension. For example, the smart meeting room system may determine a food/beverage order for the meeting based on the historical actions associated with the attendee. In some embodiments, the smart meeting room system may determine that the attendee buys a coffee at 2:00 PM every day and may determine a food/beverage order for the meeting including a coffee because the meeting occurs during 2:00 PM. The smart meeting room system may update the meeting request to include the second parameter. For example, the smart meeting room system may update the meeting request to include a coffee order.

As another non-limiting example, a smart meeting room system may receive a request to hold a meeting in a building from a meeting host, the request including meeting parameters. For example, the request may include an electronic calendar invite and a conference room location. The smart meeting room system may retrieve context information corresponding to the meeting host. For example, the smart meeting room system may retrieve survey results associated with the meeting host describing a productivity associated with various meetings having various parameters. The smart meeting room system may generate a metric describing a productivity associated with the meeting based on the meeting parameters and the context information. For example, the smart meeting room system may generate a score describing how productive the meeting is likely to be based on the meeting parameters in comparison to previous meeting parameters and corresponding survey results. The smart meeting room system may dynamically determine suggested meeting parameters for the meeting based on the metric. For example, the smart meeting room system may determine that previously early morning meetings were unproductive and may suggest that the meeting be held in the afternoon instead of the morning. The smart meeting room system may transmit a notification to the meeting host including the suggested parameters. For example, the smart meeting room system may send an email to the meeting host suggesting the meeting be held in the afternoon.

As another non-limiting example, a smart meeting room system may receive an indication that a first meeting has ended. In response to receiving the indication, the smart meeting room system may transmit a survey to attendees of the first meeting. For example, the smart meeting room system may send an email survey to the attendees. The smart meeting room system may receive, from the attendees, the survey including feedback from the attendees. For example, the feedback may be associated with the subjective experience of the attendee associated with the first meeting (e.g., whether the attendee thought the first meeting was productive or not, etc.). The smart meeting room system may receive a request to hold a second meeting, the request including at least one of the attendees. For example, an attendee of the first meeting may send an electronic calendar invite for a second meeting including themselves. The smart meeting room system may dynamically determine meeting parameters for the second meeting based on the feedback. For example, if the feedback indicates that a conference room of the first meeting was too cold then the smart meeting room system may determine a new conference room for the second meeting.

Figure 4A:
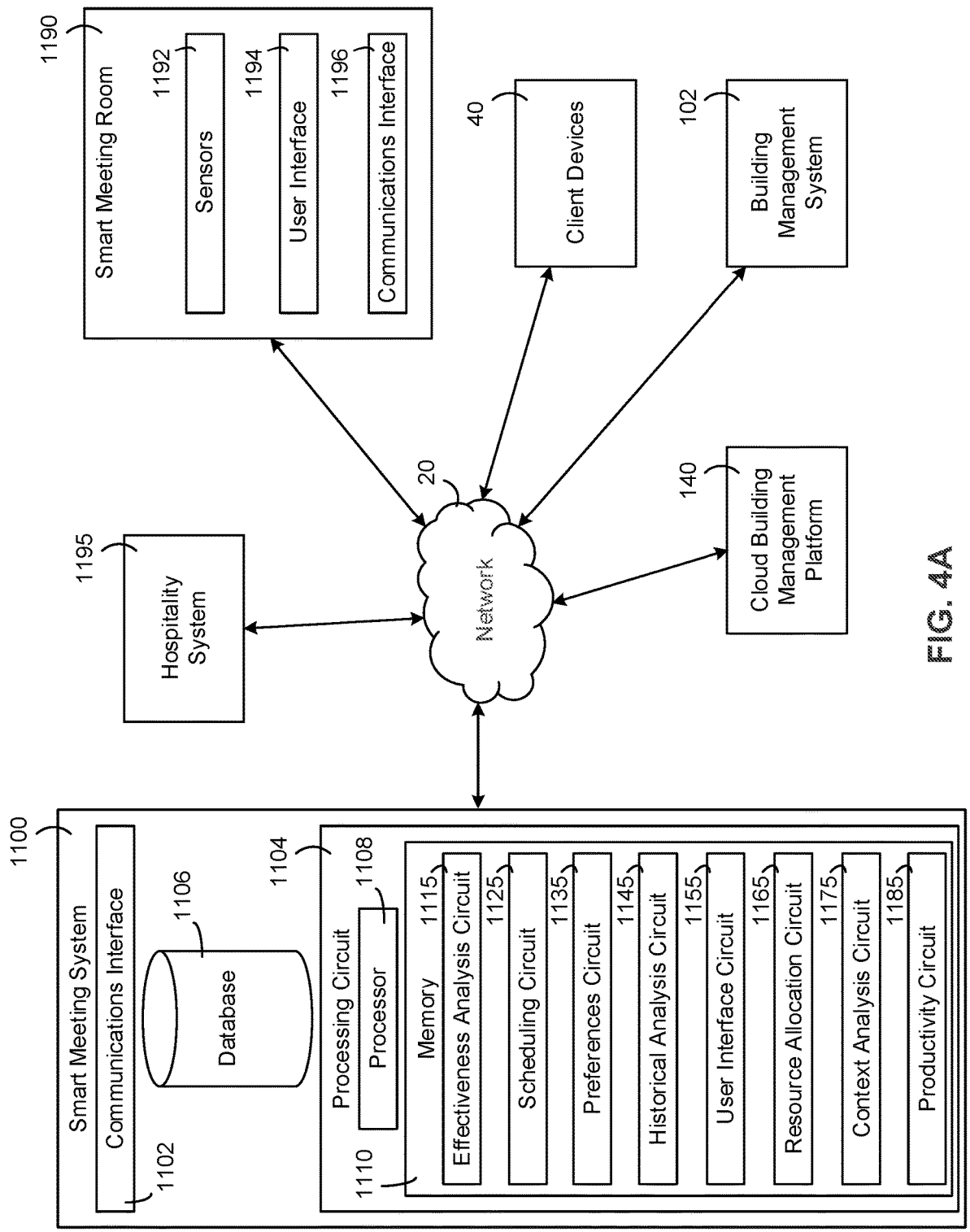
FIG. 4A is a block diagram of a smart meeting room system, according to an exemplary embodiment.
Figure 4B:
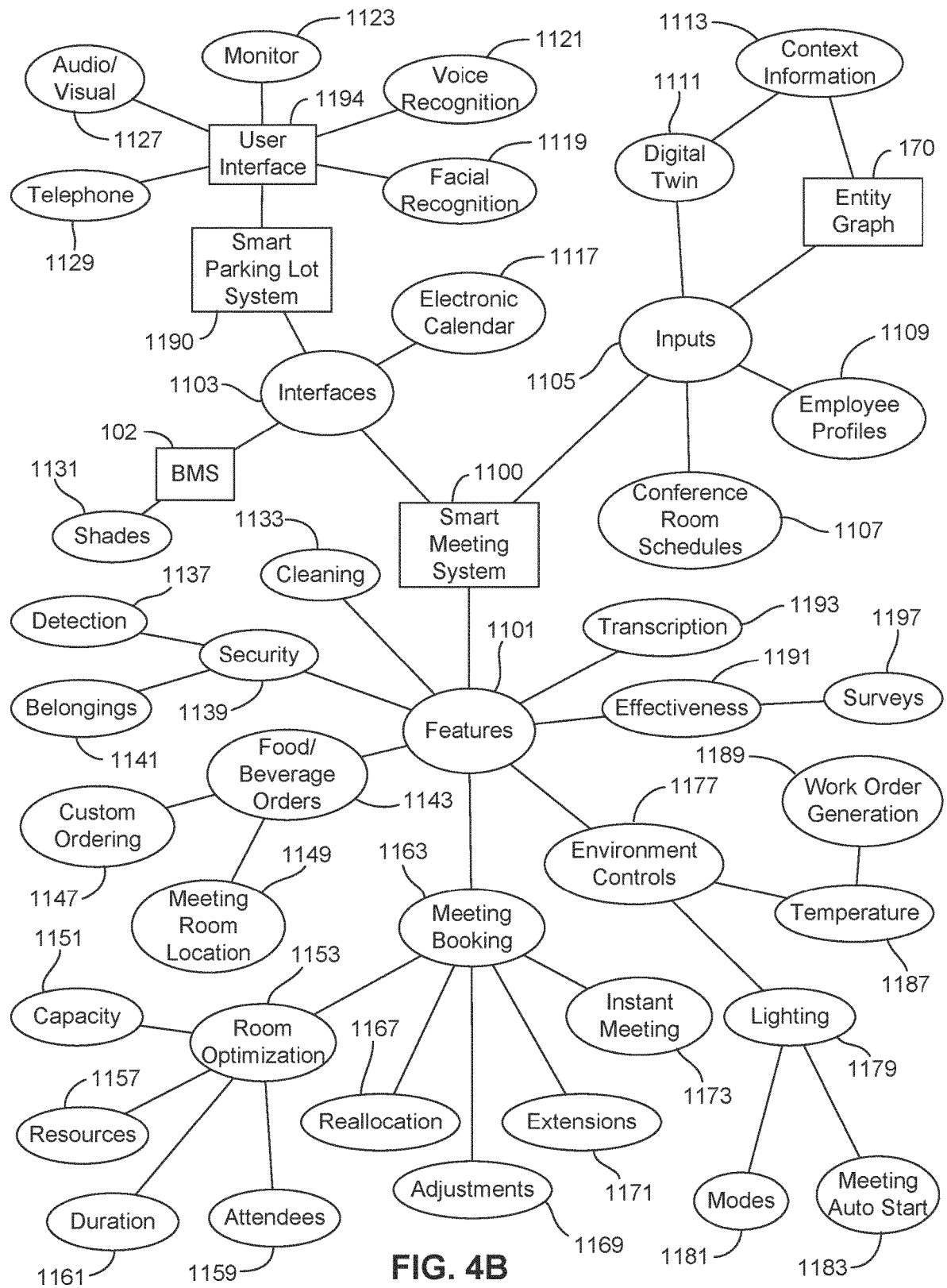
FIG. 4B is a node graph illustrating connections between features and components of the smart meeting room system of FIG. 4A, according to an exemplary embodiment.

Referring now to FIGS. 4A-4B, a smart meeting room system including smart meeting system 1100 is shown, according to an exemplary embodiment. In various embodiments, smart meeting system 1100 is configured to manage various processes associated with scheduling, holding, and following-up on meetings as well as improvements thereto. For example, smart meeting system 1100 is configured to receive a meeting request from a user and schedule a meeting room and meeting time based on analysis of meeting room schedules and attendee schedules. As another example, smart meeting system 1100 is configured to receive feedback from meeting attendees and improve future meetings based on the feedback (e.g., by changing a time of the meeting, a temperature of the meeting room, etc.). In various embodiments, smart meeting system 1100 is configured to communicate with external systems via network 20. For example, smart meeting system 1100 may communicate with client devices 40, building management system 102, cloud building management platform 140, smart meeting room 1190, and hospitality system 1195. Hospitality system 1195 may include a system for food and beverage orders within building 10. For example, hospitality system 1195 may include an office services system of building 10 and/or a catering service of building 10. In some embodiments, a user may request food and drink at a meeting via hospitality system 1195. In some embodiments, client devices 40 may not be part of smart meeting system 1100, but may be user devices such as smartphones from which smart meeting system 1100 receives input data.

In various embodiments, smart meeting system 1100 implements and/or facilities various features 1101 (e.g., as shown in FIG. 4B, etc.). For example, smart meeting system 1100 may implement transcription 1193 (e.g., voice recognition note-taking, automatic meeting minutes, machine-generating transcriptions, etc.), meeting effectiveness determinations 1191 (e.g., determining a productivity of a meeting, etc.), environmental controls 1177 (e.g., changing a room temperature, adjusting lighting, opening/closing blinds, etc.), meeting booking 1163 (e.g., scheduling conference rooms, optimizing attendee schedules, etc.), food/beverage orders 1143 (e.g., automated food/beverage orders for meetings, etc.), security 1139 (e.g., monitoring user possessions within conference rooms, monitoring conference rooms, etc.), and/or cleaning 1133 (e.g., determining cleaning schedules for conference rooms, automatically ordering cleaning for conference rooms, determining when conference rooms are dirty, etc.). For example, smart meeting system 1100 may facilitate detection 1137 of individuals within/around smart meeting room 1190 (e.g., via sensors 1192, etc.). In some embodiments, smart meeting system 1100 may identify individuals within/around smart meeting room 1190. In some embodiments, smart meeting system 1100 may facilitate identification of belongings 1141 within/around smart meeting room 1190. For example, smart meeting system 1100 may identify possessions that users' bring to a conference room (e.g., laptops, smartphones, bags, etc.). In some embodiments, smart meeting system 1100 facilitates custom food/beverage ordering 1147. For example, smart meeting system 1100 may analyze a user profile of an individual to identify a food/beverage order that the individual would enjoy (e.g., based on the preferences of the individual, etc.) and automatically order the food/beverage to a meeting room location 1149 of the individual.

In some embodiments, smart meeting system 1100 facilitates room optimization 1153. For example, smart meeting system 1100 may optimize room capacity 1151 (e.g., schedule conference rooms to optimize occupant comfort and/or conference room occupant capacity, etc.), resources 1157 (e.g., schedule conference rooms to optimize technology resources given technology demands associated with meetings, etc.), duration 1161 (e.g., minimize downtime associated with conference rooms, ensure meetings that run late don't affect future meetings, etc.), and/or attendees 1159 (e.g., schedule conference rooms according to attendee preferences, etc.). In some embodiments, smart meeting system 1100 facilitates meeting booking adjustments 1169 (e.g., changing meeting parameters such as meeting location, etc.), meeting room reallocation 1167 (e.g., alerting a user if a meeting space suddenly becomes available, etc.), and/or meeting extensions 1171 (e.g., dynamically extending meeting times, etc.). For example, smart meeting system 1100 may receive a meeting cancellation for a first meeting and determine that a second meeting would be more effective if held at the first meeting time and send a notification to an organizer of the second meeting to notify the organizer that a new meeting time is available. As a further example, smart meeting system 1100 may determine that a meeting is likely to run over a scheduled duration (e.g., based on monitoring progress of an agenda, etc.) and automatically extend the duration of the meeting. In some embodiments, smart meeting system 1100 facilitates instant meetings 1173. For example, a user may select an instant meeting and smart meeting system 1100 may dynamically generate meeting parameters for an immediate meeting. In some embodiments, smart meeting system 1100 facilitates lighting 1179 controls. For example, smart meeting system 1100 may facilitate lighting modes 1181 (e.g., a daylight mode, a dim mode, and/or a dark mode, etc.), and/or automatic lighting changes associated with a meeting start 1183 (e.g., conference room lights automatically dim at meeting start time, etc.).

In some embodiments, smart meeting system 1100 facilitates temperature controls 1187. For example, smart meeting system 1100 may receive voice input from users to control a meeting room temperature. As another example, smart meeting system 1100 may determine users' preferred meeting room temperature (e.g., based on user preferences in user profile, etc.) and adjust a meeting room temperature dynamically. In some embodiments, smart meeting system 1100 facilitates work order generation 1189. For example, smart meeting system 1100 may determine that a HVAC component associated with a meeting room is in a fault state and may dynamically generate a work order to service the HVAC component. In some embodiments, smart meeting system 1100 generates and/or transmits surveys 1197 to meeting attendees. For example, smart meeting system 1100 may generate surveys to measure meeting effectiveness and improve future meetings.

In various embodiments, smart meeting system 1100 integrates with and/or otherwise utilizes various inputs 1105. For example, smart meeting system 1100 may use digital twin 1111, context information 1113, entity graph 170, employee profiles 1109 (e.g., as included in an entity graph 170 representing a digital twin of an employee, etc.), and/or conference room schedules 1107. Although various inputs sources are described, it should be understood that smart meeting system 1100 is not limited to the input sources specifically enumerated herein. In various embodiments, smart meeting system 1100 interacts with various interfaces 1103. For example, smart meeting system 1100 may interface with BMS 102, shades 1131 (e.g., window blinds, etc.), electronic calendars 1117 (e.g., employee schedules, etc.), smart parking lot system 1190, and/or user interface 1194. For example, smart meeting system 1100 may interact with user interface 1194 to facilitate facial recognition 1119, voice recognition 1121, audio/visual controls 1127, telephonic controls 1129 (e.g., conference call controls, etc.), and/or receiving input from a monitor 1123 (e.g., a touchscreen display positioned in smart meeting room 1190, etc.).

Smart meeting room 1190 may be any meeting room configured to communicate with smart meeting system 1100. Smart meeting room 1190 may include sensors 1192, user interface 1194, and/or communications interface 1196. Sensors 1192 may include occupancy sensors, cameras (e.g., for facial recognition, etc.), biometric sensors, light sensors, weight sensors, temperature sensors, microphones (e.g., for voice recognition, etc.), and any other type of sensor. In various embodiments, sensors 1192 collect information about an environment of smart meeting room 1190 and transmit the information to smart meeting system 1100. For example, sensors 1192 may determine an occupancy of smart meeting room 1190 and transmit an occupancy status to smart meeting system 1100. User interface 1194 may facilitate user interaction with smart meeting room 1190 and/or smart meeting system 1100. For example, user interface 1194 may include displays, voice assistants, gesture detectors, tablets, control panels, remotes, and/or any other user interface device. In various embodiments, a user may interact with smart meeting system 1100 via user interface 1194. For example, a user may initiate a meeting dictation function of smart meeting system 1100 via user interface 1194. Communications interface 1196 may facilitate communication with external systems. In some embodiments, communications interface 1196 is similar to communications interface 104 described above with reference to FIG. 1A.

Speaking now generally, in various embodiments, smart meeting system 1100 facilitates or includes machine learning. For example, smart meeting system 1100 may include a recommendation engine that receives user feedback associated with meeting parameters and analyzes the user feedback to generate future meeting parameters, thereby facilitating a more personalized meeting experience. Additionally or alternatively, smart meeting system 1100 may include a rule-based recommendation engine. In various embodiments, smart meeting system 1100 balances multiple inputs. For example, smart meeting system 1100 may balance group preferences (e.g., the preferences of meeting attendees, etc.) with host preferences (e.g., the preferences of the meeting host, etc.) when generating meeting parameters (e.g., a conference room location, meeting start time, etc.). As a further example, smart meeting system 1100 may analyze preferred conference rooms of meeting attendees, preferred décor (e.g., the presence of windows, the amount of sunlight given the time of time, etc.) of meeting attendees, proximity to attendees desks, proximity to attendees next scheduled event, a type of the meeting, a temperature of the meeting room (e.g., as compared to a user's preferences, etc.), energy required to heat/cool a meeting room, and/or any other inputs. In some embodiments, smart meeting system 1100 may learn that an individual prefers east-facing conference room number one for morning meetings and may recommend the conference room number one for a 9:00 AM meeting of the individual. As a further concrete example, smart meeting system 1100 may learn that very few meetings are scheduled for Friday afternoons, may receive a meeting request for a Friday afternoon, and may suggest that the meeting be held in a meeting room having other Friday afternoon meetings to avoid having to cool a different meeting room, thereby saving energy.

In some embodiments, smart meeting system 1100 analyzes user preferences to determine meeting parameters. For example, smart meeting system 1100 may determine a meeting room for a meeting host based on a room temperature preference of the meeting host and a room characteristic preference of the meeting host (e.g., a size, location, equipment availability of the room, etc.). In some embodiments, smart meeting system 1100 is configured to determine a preferred meeting time and/or meeting duration based on past behavior and results of meetings. For example, smart meeting system 1100 may analyze meeting durations and/or time of day associated with productive meetings and high attendance, users' preferred time of day for certain types of meetings, users' preference for back-to-back meetings and/or time gaps between meetings, general working hours, users' preferences for a maximum number of hours a day spent in meetings, and/or any other user preferences. In some embodiments, smart meeting system 1100 may learn that an individual may typically run late on 30 minute meetings and may suggest booking the meetings for 45 minutes instead. As a further concrete example, smart meeting system 1100 may learn that a team is more productive when it meets in the morning and may suggest a morning time slot for future meetings. Additionally or alternatively, smart meeting system 1100 may analyze previous meetings to determine parameters associated with future meetings. For example, smart meeting system 1100 may analyze typical times and durations scheduled by users for meetings of a same type (e.g., having similar duration, attendees, etc.), meeting cancellations, extensions, rescheduling, meetings that ended early, productivity of meetings (e.g., did the meeting start on time, did the meeting that started late get extended, did the meeting host attend or did someone fill in, what percentage of required attendees attended and not just accepted the invite, what percentage of a recorded meeting actually got watched by required invitees who did not attend, was the meeting host able to complete the planned agenda, how was the quality of the connection, for example were there call drops, audio distortion, or other IT glitches, etc.), an agenda/subject for the meeting, and/or any other parameters associated with previous meetings.

In some embodiments, smart meeting system 1100 is configured to generate food/beverage recommendations for meeting attendees based on preferences and past ordering habits. For example, smart meeting system 1100 may recommend a food item for an attendee to order and the attendee may order the food item (e.g., via a mobile application, etc.). For example, smart meeting system 1100 may recommend a most recent order to a user based on the user's profile and/or an order popular with other users. As a further example, smart meeting system 1100 may recommend food/beverages that a user typically orders at a specific time of day, and/or for specific types/lengths of meetings. Additionally or alternatively, smart meeting system 1100 may correlate a user's order history with that of similar users to suggest new items that the user may enjoy. In some embodiments, smart meeting system 1100 may learn that an individual usually orders coffee when they have a meeting in the morning and may ask the individual if they would like a coffee before their morning meeting. As a further concrete example, smart meeting system 1100 may learn an individual's food preferences over time and know that the individual typically orders spicy snacks in the afternoon and may suggest a new food item that other spicy snack eaters have enjoyed. In various embodiments, smart meeting system 1100 may analyze food/beverage order histories for users (e.g., items, time of day, length of meeting, favorite foods, favorite beverages, etc.).

In some embodiments, smart meeting system 1100 is configure to learn from previous recommendations and update future recommendations based on the previous recommendations. For example, smart meeting system 1100 may analyze previous recommendations presented to a user and/or the user's choice from the previously presented recommendations. Additionally or alternatively, smart meeting system 1100 may analyze previous meeting parameters to make more intelligent recommendations in the future. For example, smart meeting system 1100 may analyze meeting characteristics (e.g., start/end time, location, attendees, meeting subject, meeting agenda, meeting type, etc.), meeting status (e.g., canceled/extended/rescheduled, did the meeting start on time, did the meeting end early, who actually attended the meeting, etc.), requests made during the meeting (e.g., food/beverage request, room resource requests, etc.), post-meeting feedback collected from users, and/or any other meeting parameters.

Still referring to FIG. 4A, smart meeting system 1100 includes communications interface 1102, processing circuit 1104, and database 1106. Communications interface 1102 is configured to facilitate communication between smart meeting system 1100 and external systems. For example, communications interface 1102 may facilitate communication between smart meeting system 1100 and smart meeting room 1190. In some embodiments, communications interface is similar to communications interface 104 described above with reference to FIG. 1A. Database 1106 is configured to store information associated with smart meeting system 1100. Database 1106 may be internal storage or external storage. For example, database 1106 may be internal storage with relation to smart meeting system 1100, and/or may include a remote database, cloud-based data hosting, or other remote data storage.

Processing circuit 1104 includes processor 1108 and memory 1110. Smart meeting system 1100 may include one or more processing circuits 1104 including one or more processors 1108 and memory 1110. Each of the processors 1108 can be a general purpose or specific purpose processor, an application specific integrated circuit (ASIC), one or more field programmable gate arrays (FPGAs), a group of processing components, or other suitable processing components. Each of the processors 1108 is configured to execute computer code or instructions stored in memory 1110 or received from other computer readable media (e.g., CDROM, network storage, a remote server, etc.).

Memory 1110 may include one or more devices (e.g., memory units, memory devices, storage devices, or other computer-readable media) for storing data and/or computer code for completing and/or facilitating the various processes described in the present disclosure. Memory 1110 may include random access memory (RAM), read-only memory (ROM), hard drive storage, temporary storage, non-volatile memory, flash memory, optical memory, or any other suitable memory for storing software objects and/or computer instructions. Memory 1110 may include database components, object code components, script components, or any other type of information structure for supporting the various activities and information structures described in the present disclosure. Memory 1110 may be communicably connected to processor(s) 1108 via processing circuit 1104 and may include computer code for executing (e.g., by processor 1108) one or more processes described herein.

Memory includes effectiveness analysis circuit 1115, scheduling circuit 1125, preferences circuit 1135, historical analysis circuit 1145, user interface circuit 1155, resource allocation circuit 1165, context analysis circuit 1175, and productivity circuit 1185. Effectiveness analysis circuit 1115 may receive feedback from user and determine an effectiveness associated with meetings. In various embodiments, effectiveness analysis circuit 1115 is configured to analyze meeting parameters and user feedback to determine suggested meeting parameters associated with a higher level of effectiveness. In some embodiments, effectiveness analysis circuit 1115 may receive first user feedback associated with a first meeting having first parameters (e.g., a time of the meeting) and may determine, based on the user feedback indicating the meeting was ineffective because it was too early in the morning, second meeting parameters (e.g., a time of the meeting) for a second meeting. In some embodiments, effectiveness analysis circuit 1115 transmits surveys to meeting attendees to determine an effectiveness associated with meetings. Surveys are described in greater detail below with reference to FIGS. 10-17. In some embodiments, effectiveness analysis circuit 1115 generates an effectiveness score associated with meetings. For example, effectiveness analysis circuit 1115 may generate a first effectiveness score associated with a first meeting based on user feedback corresponding to the first meeting. In some embodiments, the effectiveness score is associated with specific parameters of the meeting. For example, effectiveness analysis circuit 1115 may generate a first effectiveness score associated with a temperature of the meeting and a second effectiveness score associated with a time of the meeting. In some embodiments, effectiveness analysis circuit 1115 may transmit a survey to meeting attendees including a question such as "How satisfied were you with the meeting space capacity?" and may average the responses of the attendees to determine an effectiveness score associated with the size of the meeting space.

Scheduling circuit 1125 is configured to analyze schedules and generate meeting parameters. For example, scheduling circuit 1125 may generate a meeting start time and/or end time. Additionally or alternatively, scheduling circuit 1125 may generate a meeting room location (e.g., a conference room, etc.). In some embodiments, scheduling circuit 1125 may generate meeting attendees. For example, scheduling circuit 1125 may receive five potential attendees and determine, based on the schedules of the potential attendees, that the best quorum that may be achieved is with four attendees and may output the four attendees. In various embodiments, scheduling circuit 1125 may retrieve and analyze schedules. For example, scheduling circuit 1125 may retrieve schedules associated with meeting attendees. Additionally or alternatively, scheduling circuit 1125 may retrieve schedules associated with meeting rooms. In some embodiments, scheduling circuit 1125 generates a scheduling score associated with meeting parameters. For example, scheduling circuit 1125 may assign a high scheduling score to meeting parameters (e.g., a meeting start time, etc.) that fit into the schedules of a majority of meeting attendees. Scheduling circuit 1125 is discussed in greater detail below with reference to FIG. 5.

Preferences circuit 1135 is configured to analyze preferences associated with individuals associated with a meeting (e.g., meeting attendees, etc.). For example, preferences circuit 1135 may retrieve a profile including user preferences associated with each attendee of a meeting and analyze the retrieved profiles to determine meeting parameters for a meeting that satisfy the user preferences. In some embodiments, smart meeting system 1100 may receive a first meeting request and preferences circuit 1135 may retrieve user preferences associated with attendees of the meeting and may determine that all of the attendees prefer morning meetings. In some embodiments, preferences circuit 1135 generates a preferences score associated with meeting parameters. For example, preferences circuit 1135 may assign a high preferences score to meeting parameters (e.g., does the meeting room have external sunlight, etc.) that satisfy a majority of meeting attendees' preferences.

Historical analysis circuit 1145 is configured to analyze historical meeting parameters. For example, historical analysis circuit 1145 may analyze historical meeting parameters associated with a first type of meeting to determine that the first type of meeting is typically held in the morning and may suggest future meetings of the first type also be held in the morning. As a further example, historical analysis circuit 1145 may analyze historical meeting parameters associated with a second type of meeting to determine an individual who is crucial to the meeting (e.g., a VIP, a veto-member, a signee, etc.) and may suggest future meetings of the second type include the individual. As another example, historical analysis circuit 1145 may analyze historical meeting parameters to determine that a user typically orders coffee in morning meetings and may suggest a coffee order for future morning meetings including the user. In some embodiments, historical analysis circuit 1145 generates a score associated with meeting parameters. For example, historical analysis circuit 1145 may assign a high historical score to meeting parameters (e.g., individual attendees, etc.) that align with historical meeting parameters for similar meetings.

User interface circuit 1155 is configured to facilitate interaction with users. In some embodiments, user interface circuit 1155 receives communication from user interface 1194. For example, user interface circuit 1155 may receive a food/beverage order from user interface 1194 and process the food/beverage order to have the desired food/beverage delivered to smart meeting room 1190 (e.g., via hospitality system 1195, etc.). In some embodiments, user interface circuit 1155 facilitates meeting assistance. For example, interface circuit 1155 may receive audio from sensors 1192 and perform voice recognition on the audio to dynamically generate meeting minutes for a meeting. In various embodiments, user interface circuit 1155 facilitates user personalization. For example, a use may access user interface circuit 1155 (e.g., via client device 40, etc.) and adjust user preferences associated with smart meeting system 1100. In some embodiments, user interface circuit 1155 communicates with client device 40 using near-field-communication (NFC), Bluetooth, WiFi, and/or a cellular connection (e.g., via a 4G or 5G access point/small cell base station, etc.).

Resource allocation circuit 1165 is configure to analyze parameters associated with building 10 and/or smart meeting room 1190. For example, resource allocation circuit 1165 may determine that a first meeting room having high use is missing a projector and a second meeting room having low use has a projector that may be moved to the first meeting room. As a further example, resource allocation circuit 1165 may determine that it is more efficient to schedule multiple meetings back-to-back in a first meeting room than schedule multiple meetings across multiple meeting rooms and have to heat each of the multiple meeting rooms for the multiple meetings. In some embodiments, resource allocation circuit 1165 may analyze equipment work order requests associated with a first meeting room to determine that the first meeting room has far more equipment work order requests than is standard and may recommend that an electrician inspect the electrical wiring associated with the first meeting room for problems that may be causing the high rate of equipment failure. In some embodiments, resource allocation circuit 1165 generates a score associated with meeting parameters. For example, resource allocation circuit 1165 may assign a high resource score to meeting parameters (e.g., selection of meeting room, etc.) that conserve resources. In some embodiments, resource allocation circuit 1165 may assign a high resource score for a first meeting room having a temperature similar to that of preferences of the meeting attendees, thereby saving heating/cooling resources associated with the first meeting room.

Context analysis circuit 1175 is configured to analyze context information associated with meeting rooms and/or meeting attendees. For example, context circuit 1175 may analyze a schedule of an individual and determine that the individual has a meeting with a VIP at 3:00 PM and may suggest that the individual not schedule any meetings in the hour beforehand so that the individual may prepare for the meeting. As a further example, context circuit 1175 may analyze the actions of an individual to determine that the individual typically orders a coffee at 2:00 PM every day and may suggest that a 2:00 PM meeting of the individual include a coffee order. In various embodiments, context analysis circuit 1175 retrieves context information. In some embodiments, entity graph 170 includes context information. In some embodiments, context analysis circuit 1175 generates a score associated with meeting parameters. For example, context analysis circuit 1175 may assign a high context score to meeting parameters (e.g., specific food/beverage orders, etc.) that align with the context information (e.g., user actions, etc.).

Productivity circuit 1185 is configured to analyze meeting parameters and user feedback to determine a productivity associated with meetings. Additionally or alternatively, productivity circuit 1185 may generate recommendations based on the determined productivity. For example, productivity circuit 1185 may analyze user feedback associated with meetings including a first individual and may determine that meetings including the first individual usually have low productivity feedback and may recommend that future meetings not include the individual. As a further example, productivity circuit 1185 may analyze a schedule of a user and determine that the user has four straight hours of meetings in a day, and determine based on previous user feedback that the user is unproductive when they schedule more than four hours of meetings in a day, and may recommend to the user that they not schedule any more meetings for the day. In some embodiments, productivity circuit 1185 generates a score associated with meeting parameters. For example, productivity circuit 1185 may assign a high productivity score to meeting parameters (e.g., an amount of meetings in day, etc.) that are associated with user feedback indicating productivity.

Figure 5:
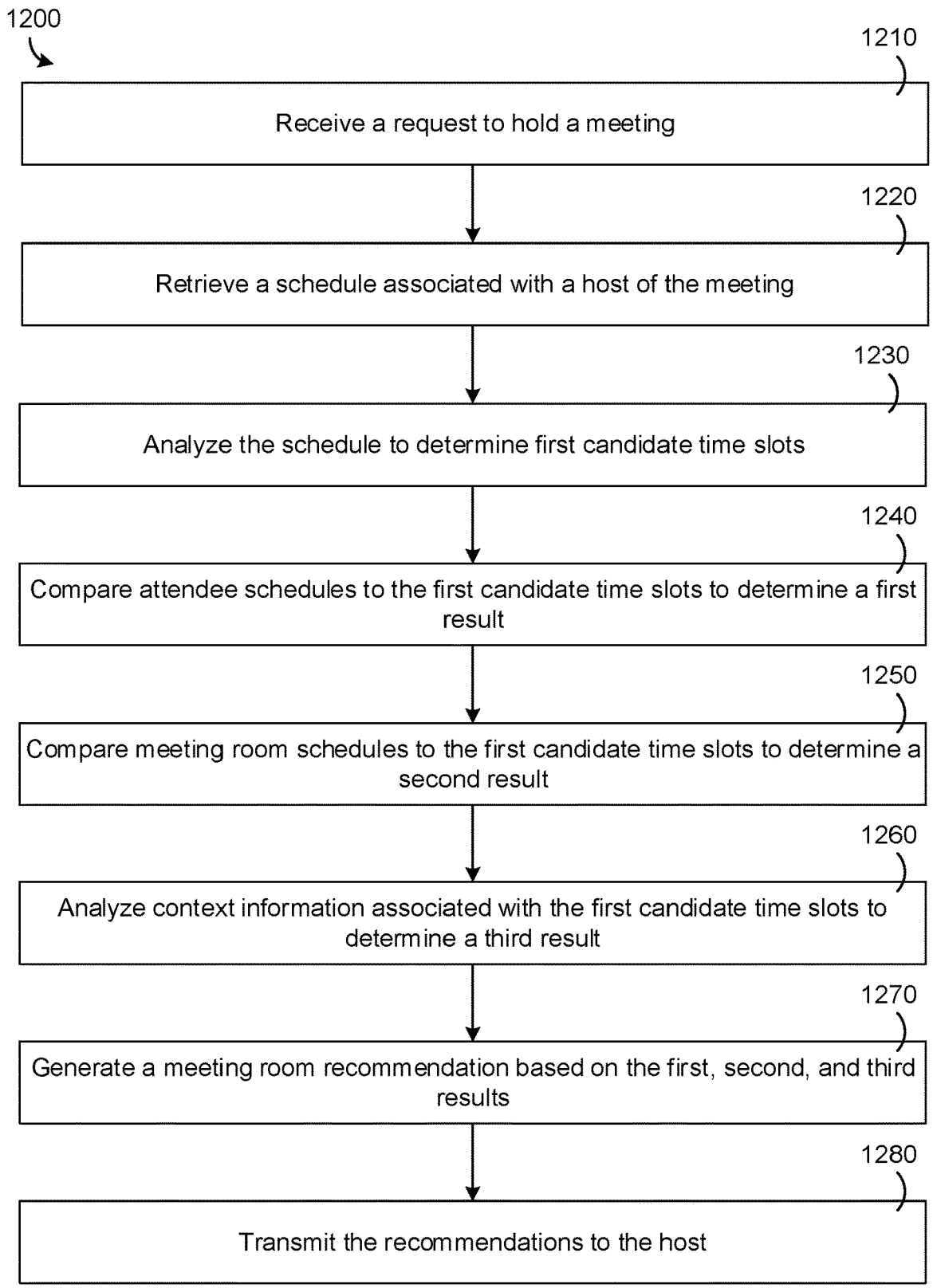
FIG. 5 is a flowchart illustrating a method of generating meeting room recommendations, according to an embodiment.

Referring now to FIG. 5, a method 1200 of generating meeting room recommendations is shown, according to an exemplary embodiment. In various embodiments, smart meeting system 1100 at least partially implements method 1200. At step 1210, smart meeting system 1100 receives a request to hold a meeting. In some embodiments, the request is an electronic calendar invite. Additionally or alternatively, user interface circuit 1155 may generate a user interface to facilitate user generation of meeting requests. For example, user interface circuit 1155 may generate a mobile phone application interface that facilitates users to generate electronic calendar invitations using smart meeting system 1100. In various embodiments, the meeting request includes meeting parameters. For example, the meeting request may include a start time, an end time, meeting attendees, and a meeting location (e.g., a conference room selection, etc.). Additionally or alternatively, the meeting request may include few and/or no meeting parameters and smart meeting system 1100 may dynamically determine the meeting parameters (e.g., fill in missing meeting parameters, suggest updated meeting parameters for existing parameters, etc.). In various embodiments, the request may include an earliest desired meeting start time, a latest desired meeting end time, a meeting duration, desired meeting rooms, an organizer (e.g., the meeting host, the individual generating the meeting request, etc.), and/or a list of attendees. At step 1220, scheduling circuit 1125 may retrieve a schedule associated with a host of the meeting. In various embodiments, scheduling circuit 1125 retrieves the schedule from a user profile (e.g., an entity graph, a data structure including information associated with users, etc.) associated with the host. For example, scheduling circuit 1125 may query entity graph 170 for an electronic calendar associated with the meeting host.

At step 1230, scheduling circuit 1125 may analyze the schedule to determine first candidate time slots. For example, scheduling circuit 1125 may determine time slots for which the schedule of the meeting host does not include a scheduled event. In some embodiments, a schedule of the meeting host may include scheduled events for a day from 9:00 AM to 2:00 PM and from 3:00 PM to 5:00 PM and scheduling circuit 1125 may determine that the time slot from 2:00 PM to 3:00 PM is a candidate time slot. At step 1240, scheduling circuit 1125 may compare attendee schedules to the first candidate time slots to determine a first result. In some embodiments, step 1240 includes retrieving schedules associated with the meeting attendees. For example, scheduling circuit 1125 may retrieve schedules associated with meeting attendees from entity graph 170 as described above. In various embodiments, scheduling circuit 1125 compares the first candidate time slots to attendee schedules as described above in reference to step 1230. For example, scheduling circuit 1125 may analyze a first attendee schedule to determine if the first attendee schedule includes any scheduled events during a first time period of the first candidate time slots. In various embodiments, the first result is a score. For example, scheduling circuit 1125 may score time periods included in the first candidate time slots based on how well they fit into the attendees' schedules. In some embodiments, the first result includes second candidate time slots. For example, the second candidate time slots may include a subset of the first candidate time slots that did not conflict with the attendees' schedules.

At step 1250, scheduling circuit 1125 may compare meeting room schedules to the first candidate time slots to determine a second result. In some embodiments, step 1250 includes comparing meeting room schedules to the first result. For example, the first result may include a subset of the first candidate time slots that did not conflict with the attendees' schedules and scheduling circuit 1125 may compare the subset of the first candidate time slots to the meeting room schedules. In some embodiments, the second result includes a score. For example, scheduling circuit 1125 may score time periods included I the first candidate time slots based on how well they fit into the meeting room schedules. In various embodiments, the second result includes third candidate time slots. For example, the third candidate time slots may include a subset of the first candidate time slots that did not conflict with the meeting room schedules. In various embodiments, scheduling circuit 1125 implements machine learning to perform method 1200.

At step 1260, context analysis circuit 1175 may analyze context information associated with the first candidate time slots to determine a third result. In some embodiments, the context information includes data (e.g., processing results, etc.) from other components of smart meeting system 1100. For example, context analysis circuit 1175 may receive weighted meeting parameters from preferences circuit 1135, historical analysis circuit 1145, and resource allocation circuit 1165 and analyze the weighted meeting parameters to determine a result. In some embodiments, context analysis circuit 1175 may receive data from resource allocation circuit 1165 associated with the heating costs associated with heating an unused conference room for a meeting and may generate a score associated with the conference room. In various embodiments, the third result includes a score. For example, the third result may include a score describing an ensemble of decisions of the components of smart meeting system 1100 associated with a meeting parameter (e.g., a meeting room location, a meeting time, etc.).

At step 1270, smart meeting system 1100 may generate a meeting room recommendation based on the first, second, and third results. In various embodiments, the meeting room recommendation includes a meeting room location (e.g., a selection of a specific conference room, a smart meeting room 1190 identifier, etc.) and/or a meeting start time and/or meeting end time. In various embodiments, smart meeting system 1100 analyzes the first, second, and third results to determine the meeting room recommendation. For example, the first, second, and third results may include scores associated with meeting parameters (e.g., a specific conference room, a meeting start time, a meeting end time, etc.) and smart meeting system 1100 may compare the scores to determine the meeting room recommendation. In some embodiments, smart meeting system 1100 includes a rules engine to determine the meeting room recommendation based on the first, second, and third results. Additionally or alternatively, smart meeting system 1100 may include a machine learning engine to determine the meeting room recommendation. At step 1280, smart meeting system 1100 may transmit the recommendation to the meeting host. For example, smart meeting system 1100 may generate an electronic calendar invitation and send it to the meeting host. Additionally or alternatively, user interface circuit 1155 may generate a user interface including the recommendation and transmit the user interface to the meeting host. For example, user interface circuit 1155 may generate user interface and transmit the user interface to a mobile phone associated with the meeting host for display on an application of the mobile phone.

Figure 6:
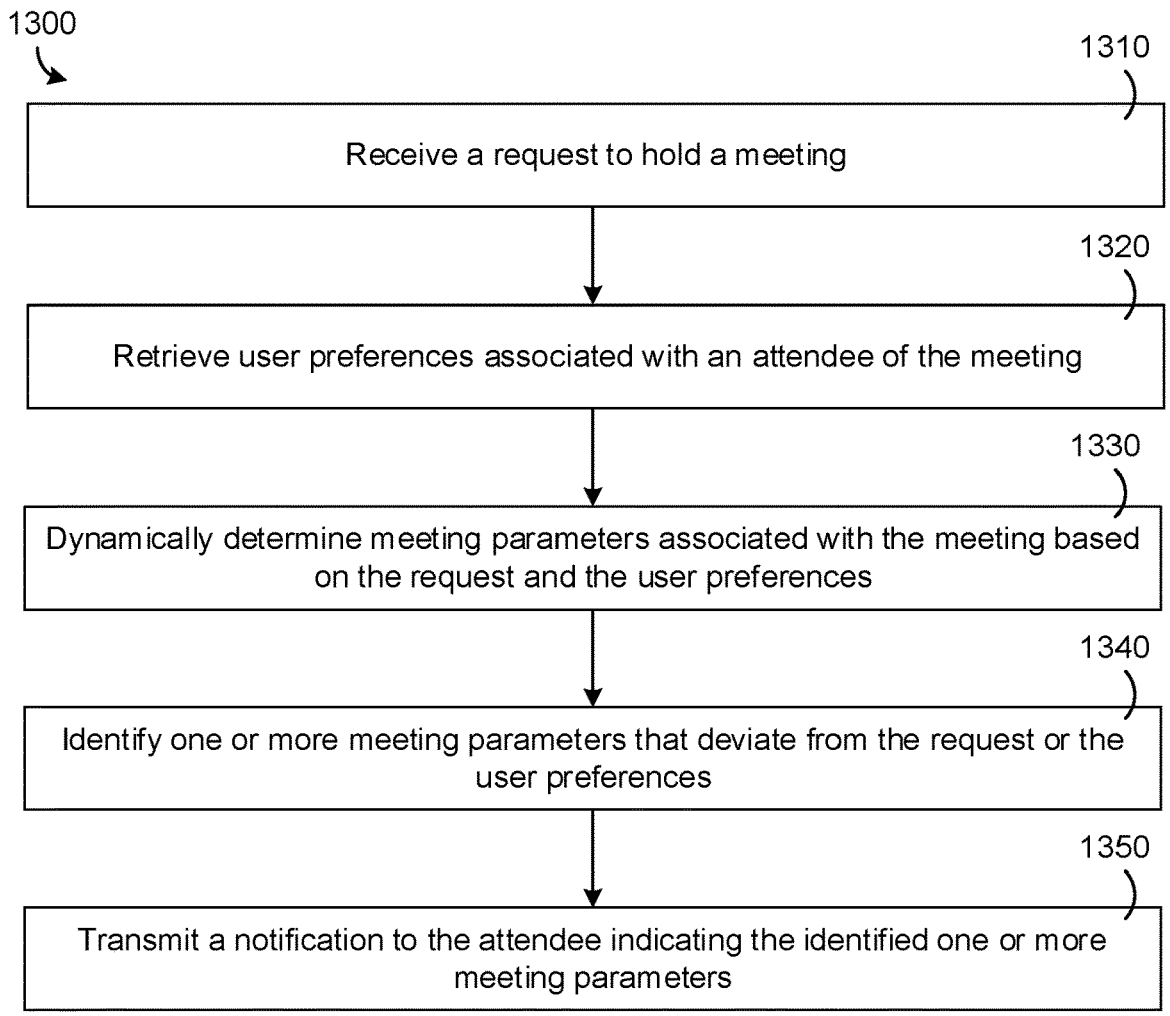
FIG. 6 is a flowchart illustrating a method of analyzing meeting parameters based on user preferences, according to an embodiment.

Referring now to FIG. 6, a method 1300 for analyzing meeting parameters based on user preferences is shown, according to an exemplary embodiment. In various embodiments, smart meeting system 1100 at least partially implements method 1300. At step 1310, smart meeting system 1100 receives a request to hold a meeting. In some embodiments, the request is an electronic calendar invite. Additionally or alternatively, user interface circuit 1155 may generate a user interface to facilitate user generation of meeting requests. For example, user interface circuit 1155 may generate a mobile phone application interface that facilitates users to generate electronic calendar invitations using smart meeting system 1100. In various embodiments, the meeting request includes meeting parameters. For example, the meeting request may include a start time, an end time, meeting attendees, and a meeting location (e.g., a conference room selection, etc.). Additionally or alternatively, the meeting request may include few and/or no meeting parameters and smart meeting system 1100 may dynamically determine the meeting parameters (e.g., fill in missing meeting parameters, suggest updated meeting parameters for existing parameters, etc.). In various embodiments, the request may include an earliest desired meeting start time, a latest desired meeting end time, a meeting duration, desired meeting rooms, an organizer (e.g., the meeting host, the individual generating the meeting request, etc.), and/or a list of attendees.

At step 1320, smart meeting system 1100 retrieves user preferences associate with an attendee of the meeting. In various embodiments, preferences circuit 1135 retrieves the user preferences from a user profile (e.g., an entity graph, a data structure including information associated with users, etc.) associated with the attendee. For example, preferences circuit 1135 may query entity graph 170 for user preferences associated with the attendee. The user preferences may include a preferred meeting room location, a preferred time of day, a preferred environmental condition (e.g., an amount of sunlight, a temperature, etc.), and/or any other user preferences. While method 1300 is described in reference to a single attendee of the meeting, it should be understood that method 1300 may be applied to any number of meeting attendees (e.g., every meeting attendee, only the meeting attendees that accept the calendar invitation, etc.) and preferences between meeting attendees may be balanced.

At step 1330, smart meeting system 1100 may dynamically determine meeting parameters associated with the meeting based on the request and the user preferences. For example, smart meeting system 1100 may analyze a number of scores produced by components of smart meeting system 1100 (e.g., preferences circuit 1135, scheduling circuit 1125, etc.) to determine the meeting parameters. The meeting parameters may include a meeting room location, a meeting start time, a meeting end time, a food/beverage order associated with the meeting, meeting attendees, and/or any other meeting parameter. In various embodiments, smart meeting system 1100 implements machine learning to dynamically determine the meeting parameters thereby balancing the preferences of the meeting attendees.

At step 1340, smart meeting system 1100 may identify one or more meeting parameters that deviate from the request and/or the user preferences. For example, a meeting attendee may prefer to have morning meetings and smart meeting system 1100 may determine that the 9:00 AM meeting start time deviates from the meeting attendee's preference. As a further example, a meeting request may include ten attendees and the parameters determined in step 1330 may include seven attendees (e.g., because three attendees are out of office, etc.), and smart meeting system 1100 may determine that the seven meeting attendees deviates from the original ten meeting attendees.

At step 1350, smart meeting system 1100 may transmit a notification to the attendee indicating the identified one or more meeting parameters (e.g., the meeting parameters that deviate from the request and/or the user preferences, etc.). In some embodiments, smart meeting system 1100 transmits the notification to the meeting host. In various embodiments, the notification may ask the recipient whether the deviation is acceptable. To continue the previous example, smart meeting system 1100 may transmit a notification to the meeting host saying: "Only seven of the ten intended invitees are available for this meeting. Is this quorum good enough?" In various embodiments, the notification may facilitate user feedback. For example, a user may accept or deny the meeting parameters determined in step 1330.

Figure 7:
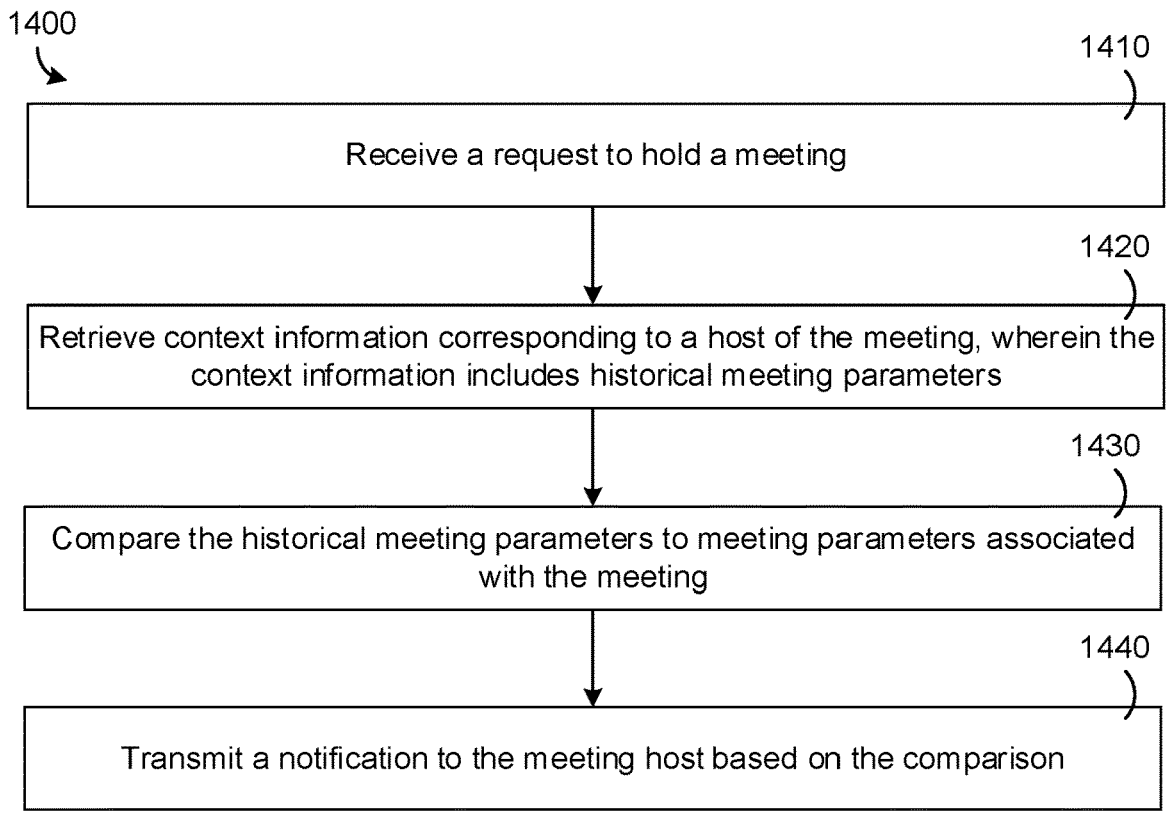
FIG. 7 is a flowchart illustrating a method of analyzing meeting parameters based on historical meeting parameters, according to an embodiment.

Referring now to FIG. 7, a method 1400 for analyzing meeting parameters based on historical meeting parameters is shown, according to an exemplary embodiment. In various embodiments, smart meeting system 1100 at least partially implements method 1400. At step 1410, smart meeting system 1100 receives a request to hold a meeting. In some embodiments, the request is an electronic calendar invite. Additionally or alternatively, user interface circuit 1155 may generate a user interface to facilitate user generation of meeting requests. For example, user interface circuit 1155 may generate a mobile phone application interface that facilitates users to generate electronic calendar invitations using smart meeting system 1100. In various embodiments, the meeting request includes meeting parameters. For example, the meeting request may include a start time, an end time, meeting attendees, and a meeting location (e.g., a conference room selection, etc.). Additionally or alternatively, the meeting request may include few and/or no meeting parameters and smart meeting system 1100 may dynamically determine the meeting parameters (e.g., fill in missing meeting parameters, suggest updated meeting parameters for existing parameters, etc.). In various embodiments, the request may include an earliest desired meeting start time, a latest desired meeting end time, a meeting duration, desired meeting rooms, an organizer (e.g., the meeting host, the individual generating the meeting request, etc.), and/or a list of attendees.

At step 1420, smart meeting system 1100 retrieves context information corresponding to a host of the meeting. In various embodiments, the context information includes historical meeting parameters. For example, the context information may include previous electronic calendar invitations and associated event parameters. In some embodiments, the context information may include the last ten instances of a monthly team meeting including the meeting room location, list of attendees, meeting start time, and meeting end time associated with each meeting. In some embodiments, smart meeting system 1100 retrieves the context information from database 1106. In various embodiments, the context information includes additional information as described above with reference to FIG. 4A.

At step 1430, historical analysis circuit 1145 may compare the historical meeting parameters to meeting parameters associated with the meeting. For example, the meeting request may include a meeting type, a meeting room location, a start time, and an end time and historical analysis circuit 1145 may compare the parameters to meeting parameters associated with a previous meeting having the same meeting type. In some embodiments, a meeting host may typically schedule a team meeting every week at 10:00 AM and historical analysis circuit 1145 may compare a current instance of the team meeting having a start time of 11:00 AM to the historical start time of 10:00 AM to determine that the meeting host may have made an error in setting up the meeting start time for the current instance of the team meeting.

At step 1440, smart meeting system 1100 may transmit a notification to the meeting host based on the comparison. To continue the previous example, smart meeting system 1100 may transmit a message to the meeting host indicating that they may have made an error in setting up the meeting start time for the current instance of the team meeting. In some embodiments, the notification may alter the meeting request. For example, the notification may automatically populate meeting parameters that the meeting host left blank in the meeting request. For example, a meeting host may generate a meeting request including a meeting type and meeting attendees and the notification may update the meeting request to include a meeting room location, a meeting start time, and meeting end time based on historical meeting parameters associated with similar meetings having the same meeting type and meeting attendees.

Figure 8:
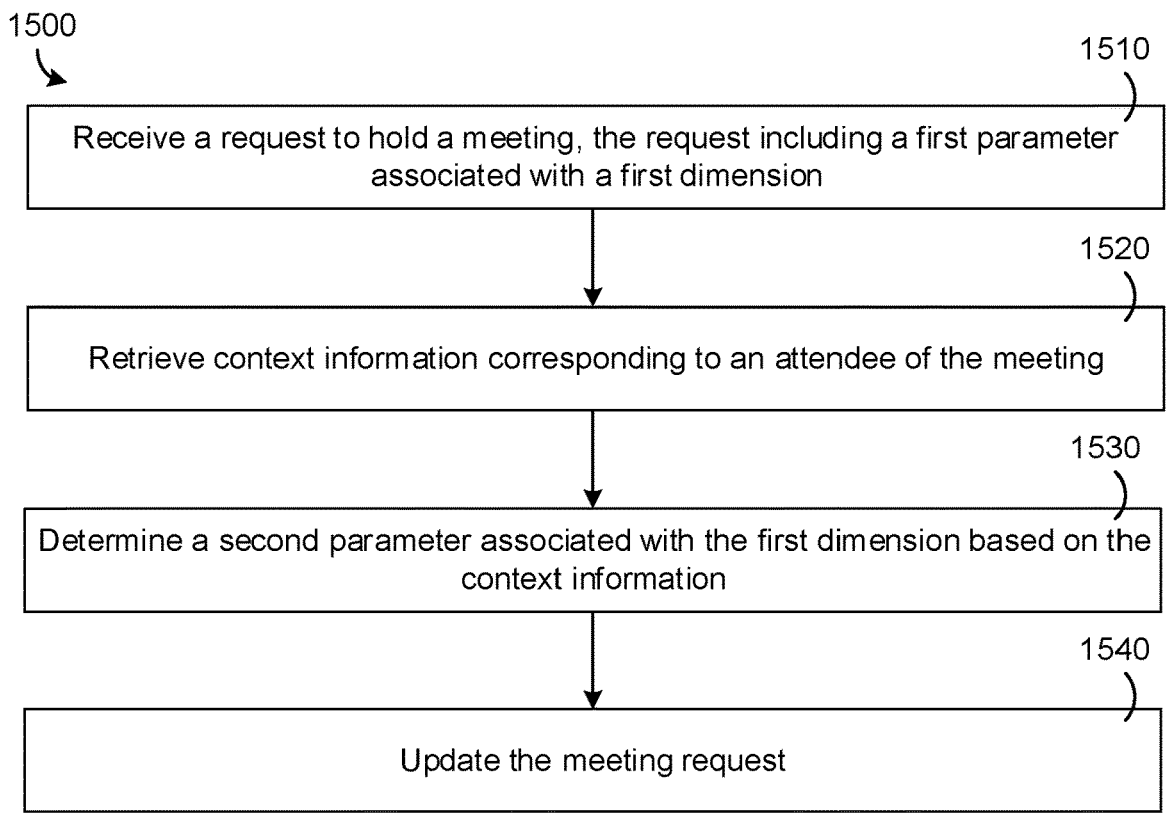
FIG. 8 is a flowchart illustrating a method of determining meeting parameters, according to an embodiment.

Referring now to FIG. 8, a method 1500 for determining meeting parameters is shown, according to an exemplary embodiment. In various embodiments, smart meeting system 1100 at least partially implements method 1500. At step 1510, smart meeting system 1100 receives a request to hold a meeting. In various embodiments, the request includes a first parameter associated with a first dimension. For example, the request may include a meeting start time (e.g., where the first parameter is a time value and wherein the first dimension is time). As a further example, the request may include a meeting room location (e.g., where the first parameter is the meeting room selection and wherein the first dimension is space). In some embodiments, the request is an electronic calendar invite. Additionally or alternatively, user interface circuit 1155 may generate a user interface to facilitate user generation of meeting requests. For example, user interface circuit 1155 may generate a mobile phone application interface that facilitates users to generate electronic calendar invitations using smart meeting system 1100. In various embodiments, the meeting request includes meeting parameters. For example, the meeting request may include a start time, an end time, meeting attendees, and a meeting location (e.g., a conference room selection, etc.). Additionally or alternatively, the meeting request may include few and/or no meeting parameters and smart meeting system 1100 may dynamically determine the meeting parameters (e.g., fill in missing meeting parameters, suggest updated meeting parameters for existing parameters, etc.). In various embodiments, the request may include an earliest desired meeting start time, a latest desired meeting end time, a meeting duration, desired meeting rooms, an organizer (e.g., the meeting host, the individual generating the meeting request, etc.), and/or a list of attendees.

At step 1520, context analysis circuit 1175 retrieves context information corresponding to an attendee of the meeting. For example, context analysis circuit 1175 may retrieve historical actions associated with an individual included as an attendee of the electronic calendar invitation. In various embodiments, the context information includes additional information as described above with reference to FIG. 4A. At step 1530, context analysis circuit 1175 may determine a second parameter associated with the first dimension based on the context information. For example, context analysis circuit 1175 may determine a food/beverage order associated with the meeting based on the historical actions of the attendee. In some embodiments, context analysis circuit 1530 may determine that the attendee typically orders a coffee at 2:00 PM every day and that the meeting request includes a start time of 1:00 PM and an end time of 3:00 PM and may determine that the food/beverage order for the meeting should include a coffee so that the attendee can still have a coffee at the typical 2:00 PM time. At step 1540, smart meeting system 1100 may update the meeting request. For example, smart meeting system 1100 may update parameters of the meeting request and/or meeting. To continue the previous example, smart meeting system 1100 may update a food/beverage order associated with the meeting to include a coffee order.

Figure 9:
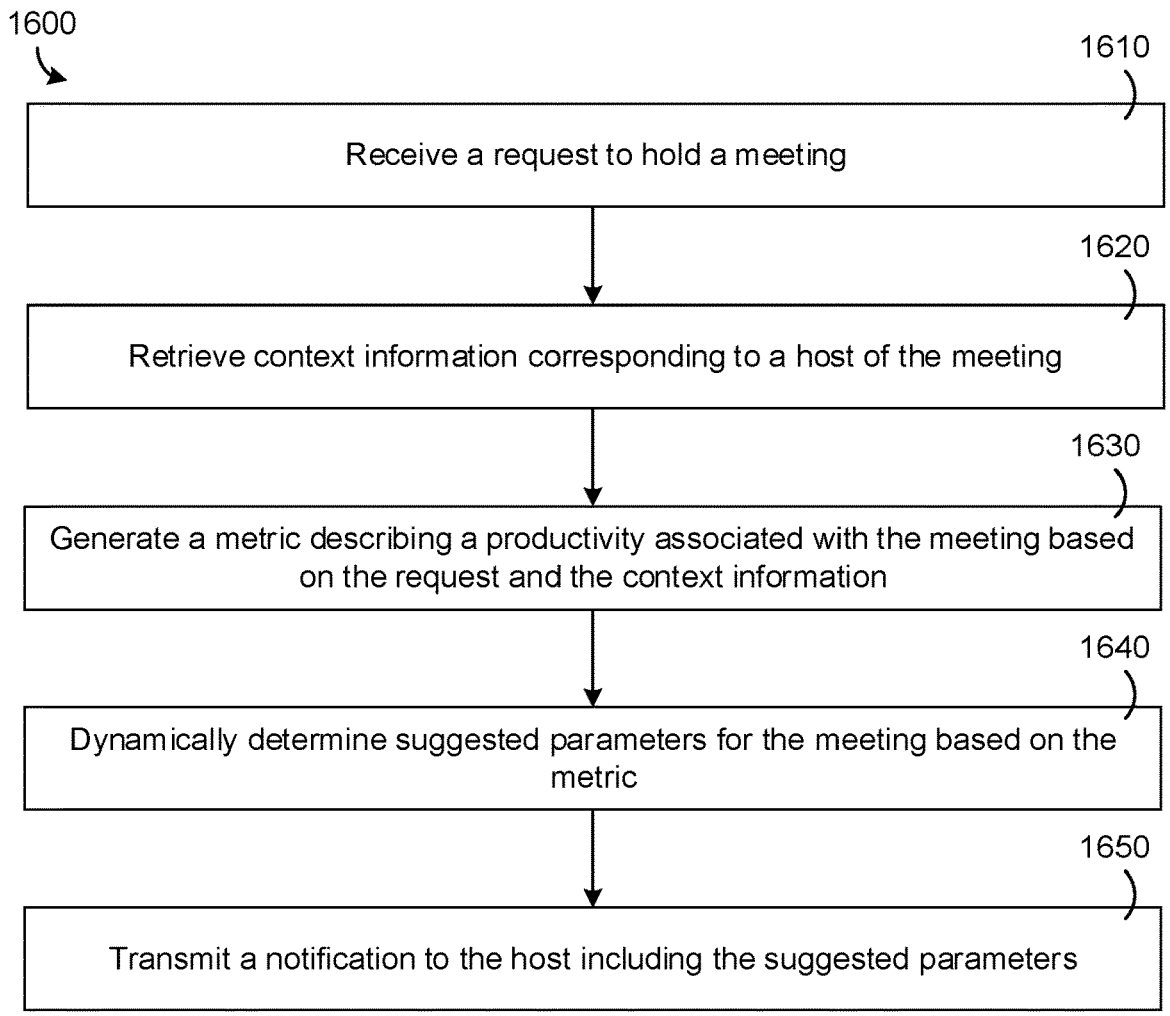
FIG. 9 is a flowchart illustrating a method of determining meeting parameters based on context information, according to an embodiment.

Referring now to FIG. 9, a method 1600 for determining meeting parameters based on context information is shown, according to an exemplary embodiment. In various embodiments, smart meeting system 1100 at least partially implements method 1600. At step 1610, smart meeting system 1100 receives a request to hold a meeting. In some embodiments, the request is an electronic calendar invite. Additionally or alternatively, user interface circuit 1155 may generate a user interface to facilitate user generation of meeting requests. For example, user interface circuit 1155 may generate a mobile phone application interface that facilitates users to generate electronic calendar invitations using smart meeting system 1100. In various embodiments, the meeting request includes meeting parameters. For example, the meeting request may include a start time, an end time, meeting attendees, and a meeting location (e.g., a conference room selection, etc.). Additionally or alternatively, the meeting request may include few and/or no meeting parameters and smart meeting system 1100 may dynamically determine the meeting parameters (e.g., fill in missing meeting parameters, suggest updated meeting parameters for existing parameters, etc.). In various embodiments, the request may include an earliest desired meeting start time, a latest desired meeting end time, a meeting duration, desired meeting rooms, an organizer (e.g., the meeting host, the individual generating the meeting request, etc.), and/or a list of attendees.

At step 1620, context analysis circuit 1175 may retrieve context information corresponding to a host of the meeting. For example, context analysis circuit 1175 may retrieve productivity information (e.g., survey results associated with meeting parameters, user feedback etc.) associated with an individual included as an attendee of the electronic calendar invitation. In various embodiments, the context information includes additional information as described above with reference to FIG. 4A. At step 1630, productivity circuit 1185 may generate a metric describing a productivity associated with the meeting based on the request and the context information. For example, productivity circuit 1185 may generate a score associated with meeting parameters of the meeting. In some embodiments, the context information may include a schedule of the host indicating that the host has five hours of meetings in a day, and user feedback indicating that the host is unproductive when they have more than five hours of meetings in a day, and the request may include a meeting start time that is on the same day, and productivity circuit 1185 may generate a low score for the meeting start time (e.g., because it would cause the meeting host to have more than five hours of meeting on the day, etc.).

At step 1640, smart meeting system 1100 may dynamically determine suggested parameters for the meeting based on the metric. To continue the example, context analysis circuit 1175 may suggest a start time for the meeting on a different day having only an hour of meetings based on the low score associated with the original meeting start time. As another example, smart meeting system 1100 may suggest leaving an attendee of the meeting request because previous meetings including the attendee have been indicated to be unproductive (e.g., as described by user feedback included in the context information, etc.). At step 1650, smart meeting system 1100 may transmit a notification to the meeting host including the suggested parameters. In some embodiments, the notification may update the meeting request and/or meeting parameters. For example, the notification may remove an attendee from a list of meeting attendees.

Referring now to FIGS. 10-13, a survey 1700 is shown, according to an exemplary embodiment. In various embodiments, smart meeting system 1100 may transmit survey 1700 to meeting attendees after the completion of a meeting. In various embodiments, smart meeting system 1100 may analyze the results of survey 1700 to improve future meeting parameter suggestions. Additionally or alternatively, smart meeting system 1100 may analyze the results of survey 1700 to determine a productivity associated with a meeting. For example, productivity circuit 1185 may generate a productivity score associated with parameters of a meeting based on survey 1700. In some embodiments, smart meeting system 1100 transmits survey 1700 to an electronic device associated with meeting attendees. For example, smart meeting system 1100 may transmit survey 1700 to a mobile phone associated with meeting attendees. As a further example, smart meeting system 1100 may transmit survey 1700 in an email to meeting attendees.

Figures 12, 13:
FIG. 12 is another user interface including survey questions, according to an embodiment.
FIG. 13 is another user interface associated with the user interfaces of FIGS. 10-12, according to an embodiment.

Survey 1700 may include question(s) 1702 having response(s) 1704. In various embodiments, smart meeting system 1100 generates question(s) 1702 dynamically. For example, smart meeting system 1100 may generate question(s) 1702 based on the meeting parameters of a meeting. In some embodiments, for a first meeting having a food/beverage order, smart meeting system 1100 may include a question 1702 associated with the food/beverage order (e.g., "How satisfied were you with the food/beverage?"), and for a second meeting without a food/beverage order, smart meeting system 1100 may omit the questions 1702 associated with the food/beverage order. Additionally or alternatively, smart meeting system 1100 may generate different question(s) 1702 over time. For example, smart meeting system 1100 may generate a first set of question(s) 1702 associated with a first set of meeting parameters for a first period of time and a second set of question(s) 1702 associated with a second set of meeting parameters for a second period of time (e.g., to avoid question fatigue, etc.). In various embodiments, question(s) 1702 are associated with various meeting parameters. For example, a first question 1702 may be associated with a meeting time and second question 1702 may be associated with a meeting duration. In some embodiments, response(s) 1704 include structured responses. For example, a response 1704 may include a numeric rating system. Additionally or alternatively, response(s) 1704 may include free-form text responses. For example, a response 1704 may include a field to accept free-form text feedback from a user. In various embodiments, survey 1700 includes a message. For example, survey 1700 may include a thank you message at the end of the survey as shown in FIG. 13. In various embodiments, survey 1700 includes user interface elements. For example, survey 1700 may include a submit button to submit the survey 1700.

Figure 14:
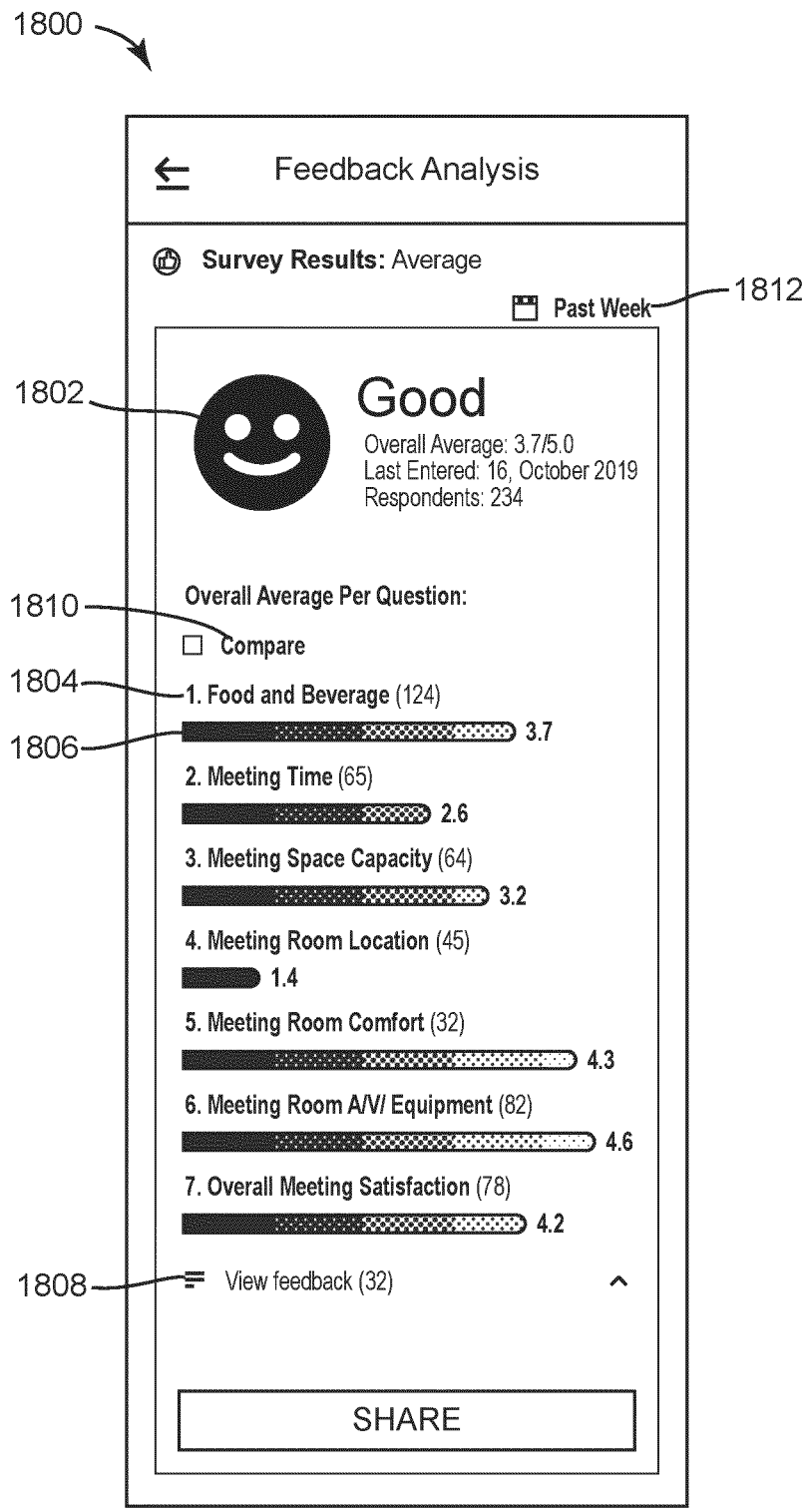
FIG. 14 is a user interface including survey responses, according to an embodiment.
Figure 15:
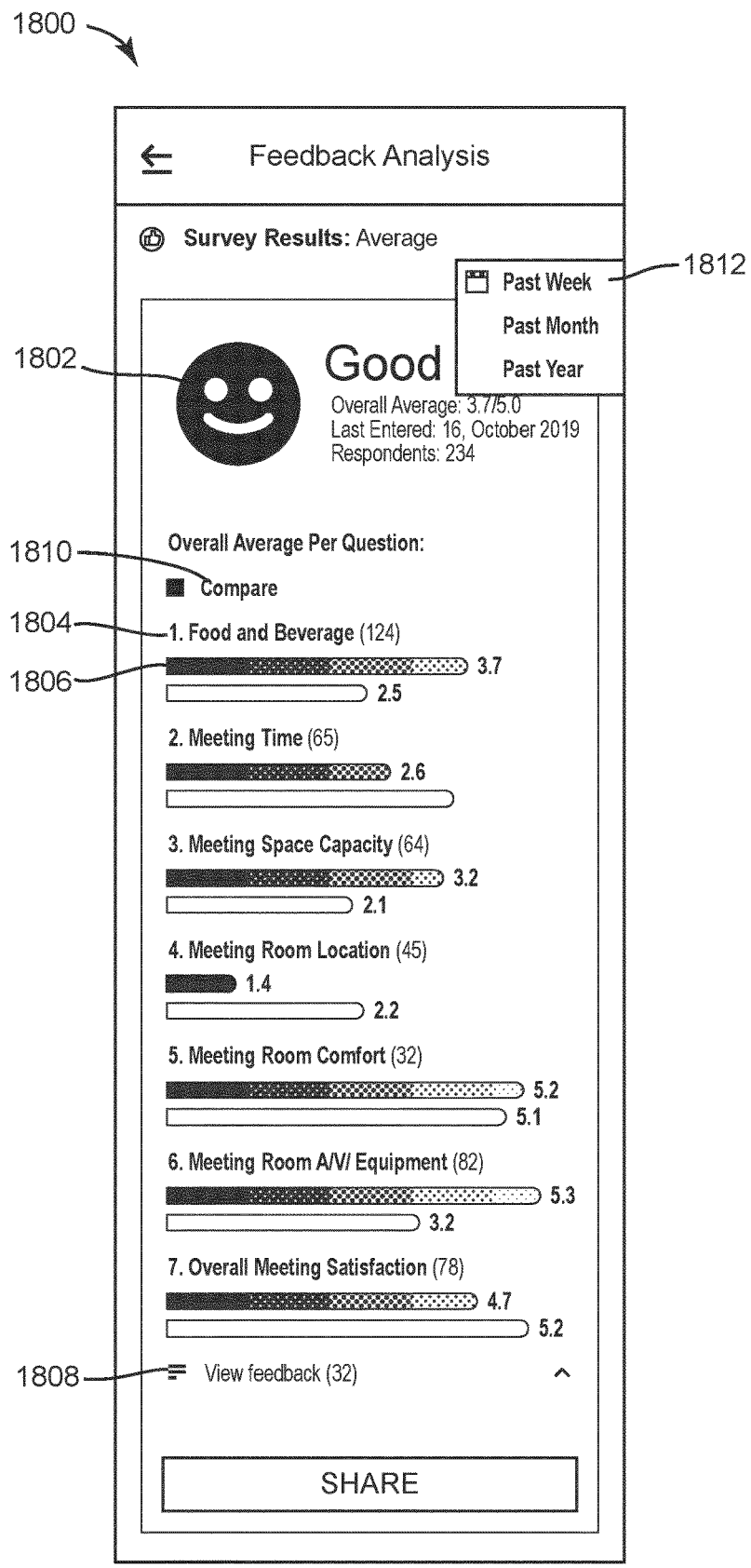
FIG. 15 is another user interface including survey responses, according to an embodiment.
Figure 16:
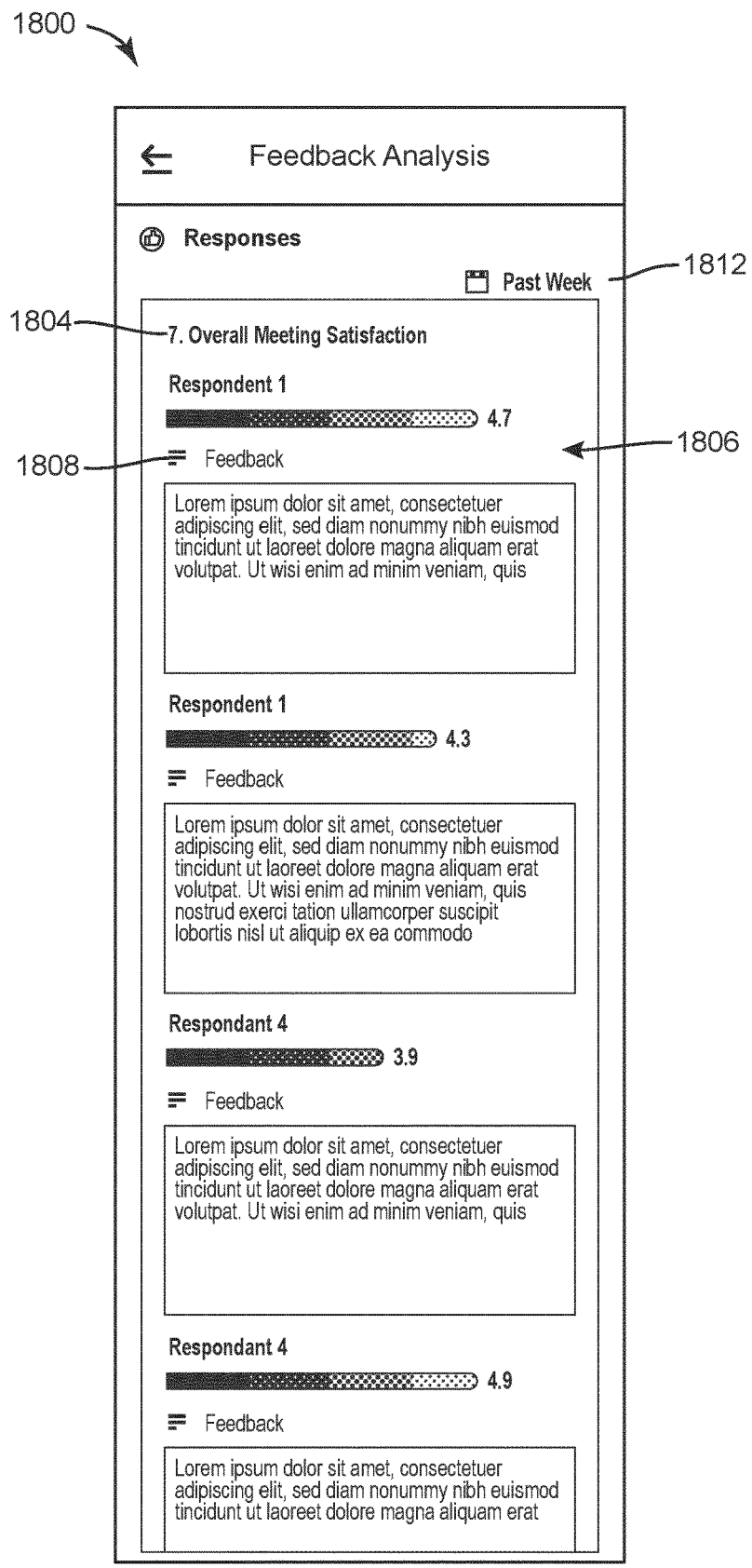
FIG. 16 is another user interface including survey responses, according to an embodiment.

Referring now to FIGS. 14-16, survey feedback 1800 is shown, according to an exemplary embodiment. In various embodiments, feedback 1800 is transmitted to meeting attendees. In some embodiments, feedback 1800 is sent as a summary email to the meeting host and/or meeting attendees. For example, in response to receiving surveys 1700 from meeting attendees and the expiration of a response window, smart meeting system 1100 may analyze response(s) 1704 to determine aggregate information and transmit the aggregate information to meeting attendees (e.g., a meeting host, etc.). In some embodiments, productivity circuit 1185 may determine a productivity associated with the meeting. Additionally or alternatively, effectiveness analysis circuit 1115 may determine an effectiveness associated with the meeting parameters.

Feedback 1800 may include summary 1802, response information 1804, response metric 1806, details 1808, compare 1810, and filter 1812. In various embodiments, summary 1802 is an overall summary of the survey 1700 results. For example, summary 1802 may include an aggregate metric associated with the response(s) 1704. In some embodiments, summary 1802 may include an overall average score of the response(s) 1704 and a number of attendees that responded. Response information 1804 may include a description of a meeting parameter (e.g., a meeting parameter for which survey 1700 included question(s) 1702 associated with, etc.). For example, survey 1700 may include question(s) 1702 associated with a food/beverage order of a meeting and response information 1804 may include "Food and Beverage." In various embodiments, each of response information 1804 is associated with each of question(s) 1702. In various embodiments, each of response information 1804 includes response metric 1806. Response metric 1806 may include results associated with question(s) 1702. For example, response metric 1806 may include an average score associated with specific question 1702. In some embodiments, response metric 1806 includes visualization information. For example, smart meeting system 1100 may generate response metric 1806 as a colored bar to indicate at a glance an attribute associated with the response. In some embodiments, smart meeting system 1100 may generate response metric 1806 as a green colored bar to indicate that users' had positive feedback associated with the specific meeting parameter (e.g., a score associated with the response(s) 1704 was high, etc.)

Details 1808 may include additional information associated with response information 1804. For example, details 1808 may include a response metric 1806 associated with individual user feedback. In some embodiments, details 1808 include free-form text feedback. For example, a question 1702 may include a response 1704 that accepts free-form text input and details 1808 may display the associated free-form text responses. In some embodiments, smart meeting system 1100 analyzes free-form text responses and displays the free-form text responses based on the analysis in details 1808. For example, smart meeting system 1100 may analyze free-form text responses and display a free-form text response determined to be the most relevant.

Compare 1810 may be configured to facilitate comparison between response information 1804 and/or response metric 1806, etc. For example, compare 1810 may facilitate comparing response metrics 1806 between two previous meetings. In some embodiments, a user may compare a score associated with a meeting food/beverage service between previous meetings to determine if the food/beverage service is improving over time. Filter 1812 may facilitate displaying and/or comparing information from different time periods. For example, filter 1812 may facilitate displaying survey results from the past week or the past year. In some embodiments, filter 1812 may facilitate comparing survey results from meetings of a similar type. For example, survey results associated with a reoccurring meeting may be displayed via filter 1812.

Figure 17:
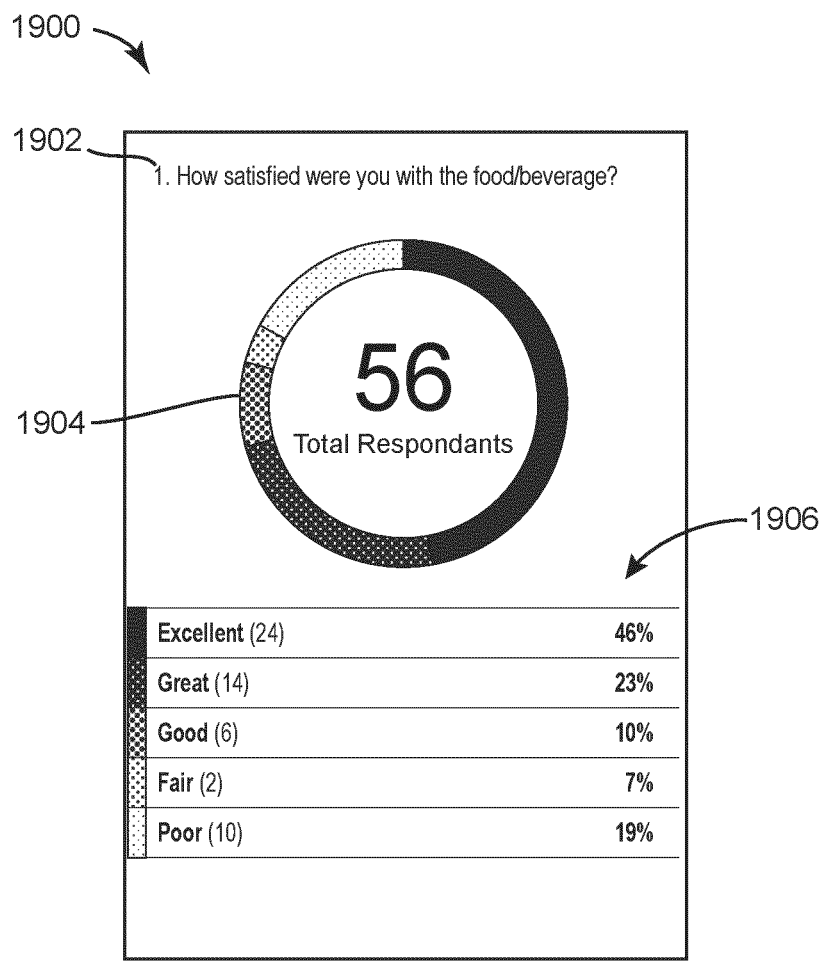
FIG. 17 is another user interface including survey responses, according to an embodiment.

Referring now to FIG. 17, a results dashboard 1900 is shown, according to an exemplary embodiment. Results dashboard 1900 may include a summary of survey 1700 results. For example, results dashboard 1900 may include an abbreviated form of feedback 1800. In various embodiments, results dashboard 1900 is displayed to a meeting host after a meeting. Additionally or alternatively, results dashboard 1900 may be displayed to other individuals associated with the meeting. For example, results dashboard 1900 may be displayed to a supervisor of a meeting attendee. In various embodiments, results dashboard 1900 is configured to provide an at-a-glance summary of survey 1700 results. For example, results dashboard 1900 may be included in a summary email to a meeting host following a meeting. Additionally or alternatively, results dashboard 1900 may be displayed within an electronic calendar. For example, an electronic calendar event may include results dashboard 1900 following completion of the event. Results dashboard 1900 includes parameter 1902, summary 1904 and details 1906. Parameter 1902 may be similar to response information 1804 described above. In some embodiments, parameter 1902 is associated with a meeting parameter. For example, a first parameter 1902 may be associated with a food/beverage service of a meeting and a second parameter 1902 may be associated with a meeting time of the meeting. Summary 1904 may include a summary of survey 1700 results. In some embodiments, summary 1904 is associated with a meeting parameter. For example, summary 1904 may be associated with a meeting parameter described by parameter 1902. Details 1906 may include additional information associated with a meeting parameter. For example, details 1906 may include a breakdown of scores associated with a meeting parameter and the number of meeting attendees who gave the score. In various embodiments, details 1906 is similar to details 1808 described above.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry. The term processing circuit as used herein may include hardware, software, and any combination thereof. For example, a processing circuit may include a processor and memory having instructions stored thereon that, when executed by the processor, cause the processing circuit to perform the operations described herein.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection.

The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. One or more non-transitory computer-readable storage media having instructions stored thereon that, when executed by one or more processors, cause the one or more processors to:

receive a request to hold a meeting in a building;

retrieve user preferences associated with an attendee of the meeting from a digital twin, the digital twin storing representations of a plurality of entities and relationships between the plurality of entities, the plurality of entities including the attendee, user preferences of the attendee, and equipment associated with a meeting room of the meeting;

dynamically determine meeting parameters associated with the meeting based on the request and the user preferences;

identify one or more meeting parameters that deviate from the request or the user preferences;

transmit a notification indicating the one or more meeting parameters and store the meeting for the meeting room within the digital twin; and operate the equipment associated with the meeting room using the relationships between the plurality of entities within the digital twin to identify the equipment associated with the meeting room.

2. The one or more non-transitory computer-readable storage media of claim 1, wherein the request includes meeting attendees and wherein the one or more meeting parameters that deviate include one or more of the meeting attendees that cannot attend the meeting.

3. The one or more non-transitory computer-readable storage media of claim 1, wherein the request includes a meeting time and wherein the one or more meeting parameters that deviate include the meeting time.

4. The one or more non-transitory computer-readable storage media of claim 1, wherein the meeting parameters include at least a meeting time, a conference room, and available attendees.

5. The one or more non-transitory computer-readable storage media of claim 4, wherein the user preferences include a preferred conference room and wherein the one or more meeting parameters that deviate include the conference room, wherein the conference room is different than the preferred conference room.

6. The one or more non-transitory computer-readable storage media of claim 4, wherein the user preferences include a preferred meeting time and wherein the one or more meeting parameters that deviate include the meeting time, wherein the meeting time is different than the preferred meeting time.

7. The one or more non-transitory computer-readable storage media of claim 4, wherein the request includes meeting attendees, wherein the available attendees are a subset of the meeting attendees and wherein the notification is transmitted in response to comparing a number of the available attendees to a number of the meeting attendees.

8. The one or more non-transitory computer-readable storage media of claim 1, wherein the one or more processors dynamically determines second meeting parameters in response to the attendee responding to the notification.

* * * * *